United States Patent
Mashima et al.

(10) Patent No.: US 8,953,284 B1
(45) Date of Patent: Feb. 10, 2015

(54) MULTI-READ SENSOR HAVING A NARROW READ GAP STRUCTURE

(71) Applicant: HGST Netherlands B.V., Amsterdam (NL)

(72) Inventors: Hideki Mashima, Odawara (JP); Nobuo Yoshida, Hiratsuka (JP); Masashi Hattori, Odawara (JP); Tutomu Yasuda, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/085,734

(22) Filed: Nov. 20, 2013

(51) Int. Cl.
G11B 5/39 (2006.01)

(52) U.S. Cl.
USPC .......... 360/316; 360/314; 360/322; 360/324.2

(58) Field of Classification Search
USPC .......... 360/314, 316, 319, 322, 324.1, 324.11, 360/324.12, 324.2, 121
See application file for complete search history.

(56) References Cited

U.S. PATENT DOCUMENTS

| | | | |
|---|---|---|---|
| 4,901,177 A | 2/1990 | Lazzari | |
| 5,309,305 A | 5/1994 | Nepela et al. | |
| 5,784,772 A | 7/1998 | Ewasko et al. | |
| 6,826,140 B2 | 11/2004 | Brommer et al. | |
| 6,970,331 B1 | 11/2005 | He et al. | |
| 7,408,730 B2* | 8/2008 | Yamagishi | 360/46 |
| 7,773,347 B2 | 8/2010 | Maejima et al. | |
| 8,786,987 B2* | 7/2014 | Edelman et al. | 360/324.12 |
| 2003/0214762 A1* | 11/2003 | Sharma et al. | 360/324.2 |
| 2005/0248870 A1 | 11/2005 | Monk et al. | |
| 2009/0279212 A1* | 11/2009 | Engel et al. | 360/314 |
| 2009/0316309 A1* | 12/2009 | Partee et al. | 360/324.2 |
| 2011/0069413 A1* | 3/2011 | Maat et al. | 360/234.3 |
| 2012/0206830 A1 | 8/2012 | Gao et al. | |

OTHER PUBLICATIONS

Tsang, C. et al., "Gigabit Density Recording Using Dual-Element MR/Inductive Heads on Thin-Film Disks," IEEE Transactions on Magnetics, vol. 26, No. 5, Sep. 1990, pp. 1689-1693.

Aruga, K., "Probabilistic Analysis of Off-Track Capability Assuming Geometric Track Misregistration Model for Higher Track Density Disk Drives," IEEE Transactions on Magnetics, vol. 45, No. 11, Nov. 2009, pp. 5022-5025.

* cited by examiner

*Primary Examiner* — Jefferson Evans
(74) *Attorney, Agent, or Firm* — Zilka-Kotab, PC

(57) ABSTRACT

In one embodiment, a magnetic head includes a lower shield layer positioned at a media-facing surface of the magnetic head, at least two magnetoresistive (MR) elements positioned above the lower shield layer, each MR element extending in an element height direction away from the media-facing surface of the magnetic head, back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation, and an upper shield layer positioned above the MR elements that is configured to electrically communicate with the MR elements.

20 Claims, 25 Drawing Sheets

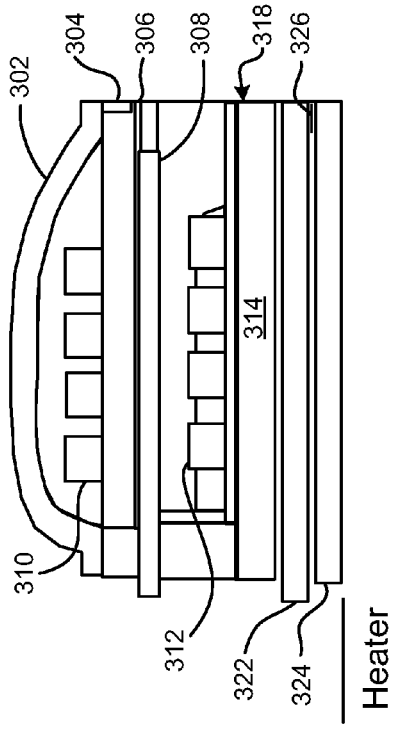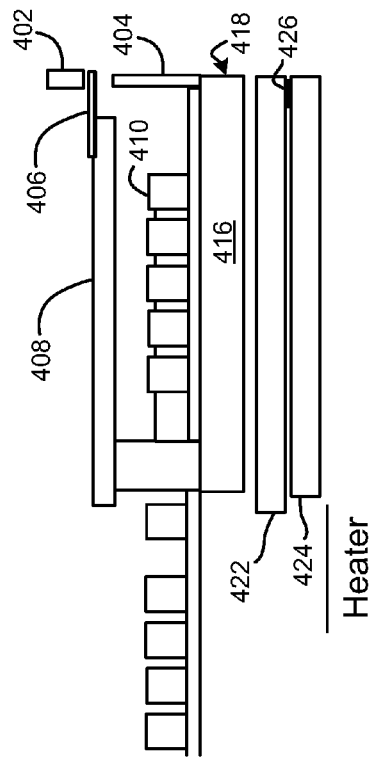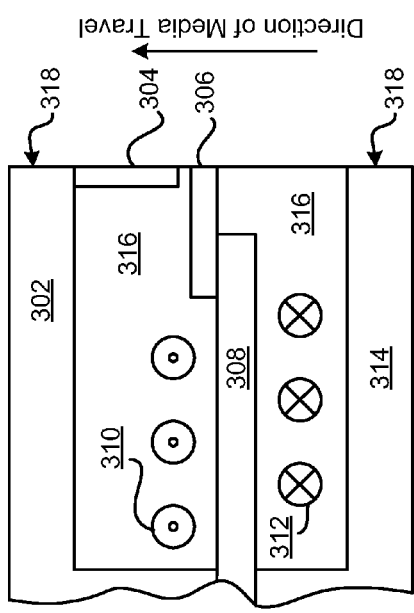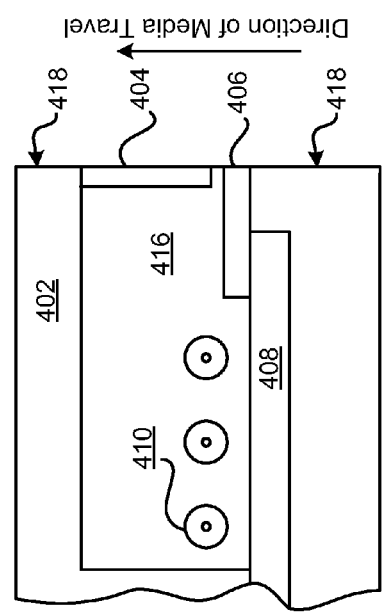
FIG. 3A
FIG. 3B
FIG. 4A
FIG. 4B

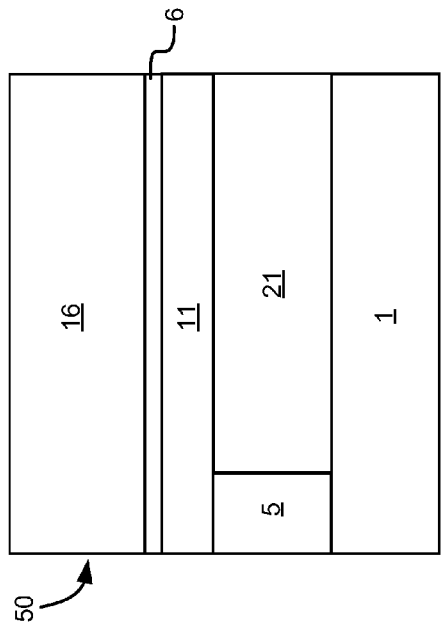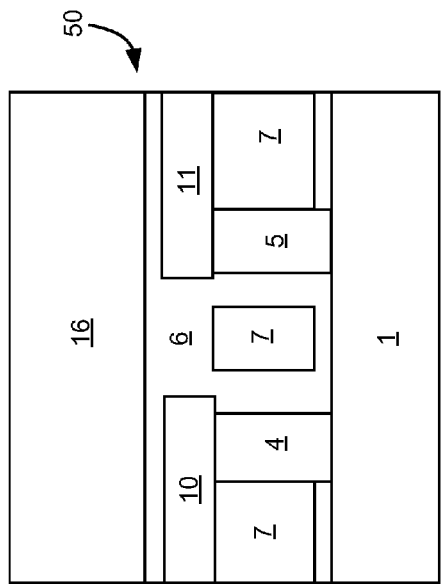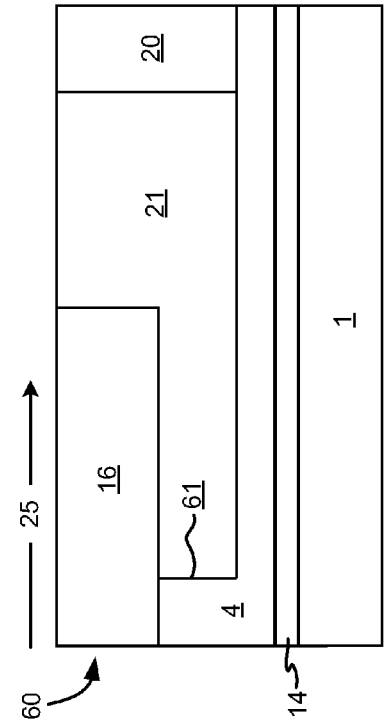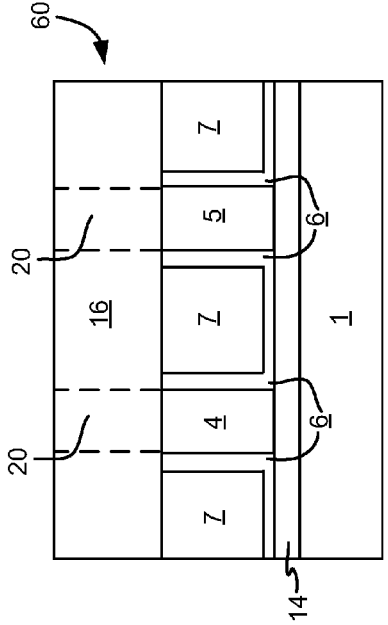

MULTI-READ SENSOR HAVING A NARROW READ GAP STRUCTURE

FIELD OF THE INVENTION

The present invention relates to magnetic heads, and more particularly, this invention relates to a magnetic head having a multi-read sensor with a narrow read gap structure.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

Magnetoresistive effect type magnetic heads are employed as sensors for reading magnetic information (data) recorded on a magnetic recording medium (such as a hard disk) in high-density magnetic recording devices (such as HDDs). The use of magnetic read heads that utilize a magnetoresistive effect has become commonplace. One such magnetoresistive effect type read head uses a giant magnetoresistive (GMR) effect in a multi-layered film formed by laminating a ferromagnetic metal layer on a non-magnetic intermediate layer. The first kind of GMR heads employed were Current-In-Plane (CPP)-type heads in which electrical signals flow in parallel with the film plane to the sensor membrane. Next, Tunneling Magnetoresistive (TMR)-effect heads and Current-Perpendicular-To-Plane (CPP)-GMR heads, which are considered advantageous from the standpoint of track narrowing, gap narrowing, and increased output, were developed with improved recording density in mind. TMR heads are now the most commonly employed magnetic read head. TMR heads and CPP-GMR heads differ from conventional GMR heads, they differ signficantly from CIP-type heads, and they differ from CPP-type heads.

While the demand in recent years for even higher density recording has been met by techniques based on narrowing the effective track width of a magnetoresistive sensor, this track width narrowing has resulted in other problems of increased element resistance, increased noise, lowered sensitivity, and difficulties in increasing the sensitivity.

Multi-element magnetic heads designed to accommodate higher density recording have been proposed to alleviate these problems. Multi-element magnetic heads are advantageous in that they comprise a magnetic head with a large number of elements of a size greater than a bit size of the medium, and this allows for bit data to be read from the difference in the plurality of signals produced thereby. Because the element size may be increased beyond a single bit size, noise is able to be suppressed and sensitivity is able to be increased.

One such multi-element magnetic head 50 is shown from a media-facing surface in FIG. 5A and from a side view in FIG. 5B and according to the prior art. An inherent problem in the multi-element read head 50 is that although it allows for the formation of each element 4, 5 to have a size greater than a recording bit size, the inter-shield distance (also referred to as the read gap width, which is the distance between the lower magnetic shield layer 1 and the upper magnetic shield layer 16 in the head 50) is expanded because of the arrangement of a first wiring layer 10 and a second wiring layer 11 which are configured for separately extracting signals from their respective elements, first element 4 and second element 5. The multi-element read head 50 also includes an insulating layer 21 positioned behind the MR elements 4, 5, a magnetic domain control layer 7 disposed therebetween and on both sides of the MR elements 4, 5, and an insulating layer 6 between the upper magnetic shield layer 16 and the first wiring layer 10 and the second wiring layer 11.

SUMMARY

In one embodiment, a magnetic head includes a lower shield layer positioned at a media-facing surface of the magnetic head, at least two magnetoresistive (MR) elements positioned above the lower shield layer, each MR element extending in an element height direction away from the media-facing surface of the magnetic head, back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation, and an upper shield layer positioned above the MR elements that is configured to electrically communicate with the MR elements.

In another embodiment, a magnetic head includes a lower shield layer positioned at a media-facing surface of the magnetic head, at least two MR elements positioned above the lower shield layer, each MR element extending in an element height direction away from the media-facing surface of the magnetic head, back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation, and an upper wiring layer positioned above each MR element at the media-facing surface of the magnetic head and extending in the element height direction away from the media-facing surface of the magnetic head, the upper wiring layer being configured to electrically communicate with the back wiring layer, wherein the upper wiring layer is configured to act as an upper electrode for the MR elements, and wherein the lower shield layer is configured to act as a lower electrode for the MR elements.

In yet another embodiment, a method for forming a magnetic head includes forming a lower shield layer, forming at least two MR elements positioned above the lower shield layer at a media-facing surface of the magnetic head, each MR element extending in an element height direction away from the media-facing surface of the magnetic head, forming a back wiring layer positioned above the at least two MR elements at a position away from the media-facing surface of the magnetic head in the element height direction, wherein the back wiring layer is configured to electrically communicate with the at least two MR elements and configured to separately extract signals from each MR element during a read operation, and forming an upper shield layer positioned above the at least two MR elements and configured to electrically communicate with the at least two MR elements, wherein the upper shield layer is configured to act as an upper electrode for the at least two MR elements.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5A shows a multi-element magnetoresistive (MR) read head according to the prior art as seen from a media-facing surface thereof.

FIG. 5B shows a side view of a multi-element magnetic head according to the prior art.

FIG. 6A shows a multi-element magnetic head according to one embodiment as seen from a media-facing surface thereof.

FIG. 6B shows a side view of a multi-element magnetic head according to one embodiment.

DETAILED DESCRIPTION

Figure 1:
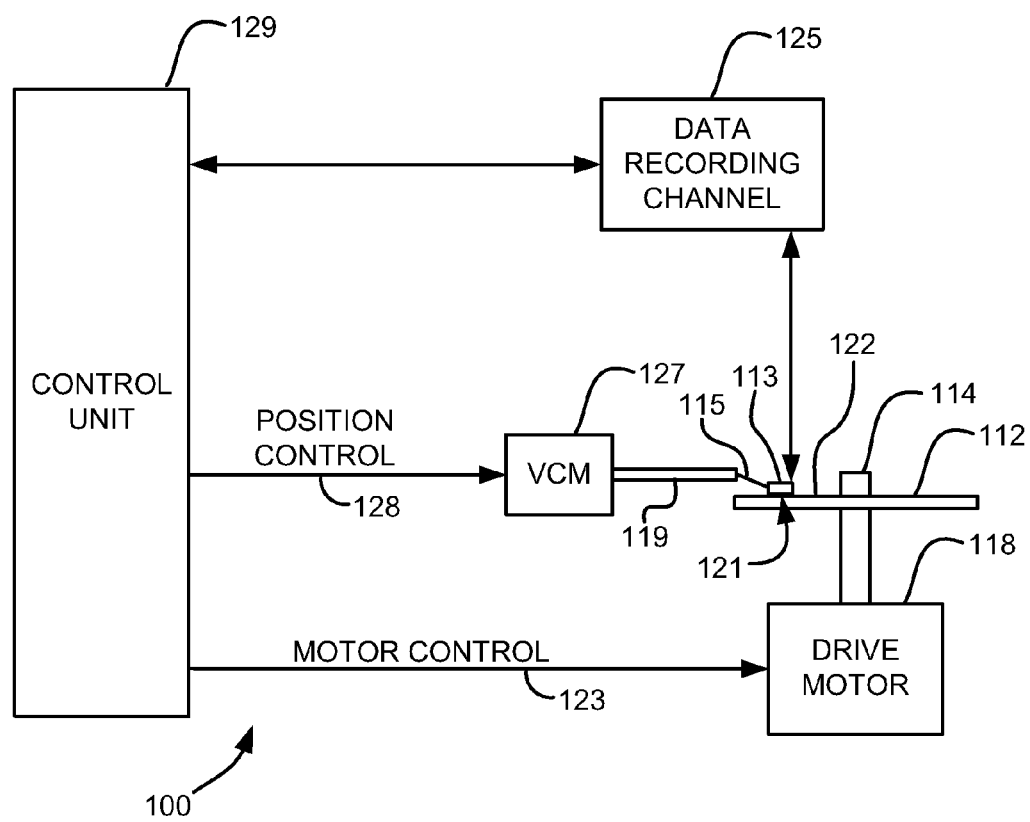
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one embodiment, the signals may be separately extracted from multiple elements in a multi-element read head by extracting each of the signals using a wire in the element height direction. Furthermore, a desired narrowing of the read gap width may be facilitated along with a desired increase in the recording density of the media without increasing noise significantly.

In one general embodiment, a magnetic head includes a lower shield layer positioned at a media-facing surface of the magnetic head, at least two magnetoresistive (MR) elements positioned above the lower shield layer, each MR element extending in an element height direction away from the media-facing surface of the magnetic head, back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation, and an upper shield layer positioned above the MR elements that is configured to electrically communicate with the MR elements.

In another general embodiment, a magnetic head includes a lower shield layer positioned at a media-facing surface of the magnetic head, at least two MR elements positioned above the lower shield layer, each MR element extending in an element height direction away from the media-facing surface of the magnetic head, back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation, and an upper wiring layer positioned above each MR element at the media-facing surface of the magnetic head and extending in the element height direction away from the media-facing surface of the magnetic head, the upper wiring layer being configured to electrically communicate with the back wiring layer, wherein the upper wiring layer is configured to act as an upper electrode for the MR elements, and wherein the lower shield layer is configured to act as a lower electrode for the MR elements.

In yet another general embodiment, a method for forming a magnetic head includes forming a lower shield layer, forming at least two MR elements positioned above the lower shield layer at a media-facing surface of the magnetic head, each MR element extending in an element height direction away from the media-facing surface of the magnetic head, forming a back wiring layer positioned above the at least two MR elements at a position away from the media-facing surface of the magnetic head in the element height direction, wherein the back wiring layer is configured to electrically communicate with the at least two MR elements and configured to separately extract signals from each MR element during a read operation, and forming an upper shield layer positioned above the at least two MR elements and configured to electrically communicate with the at least two MR elements, wherein the upper shield layer is configured to act as an upper electrode for the at least two MR elements.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2E:
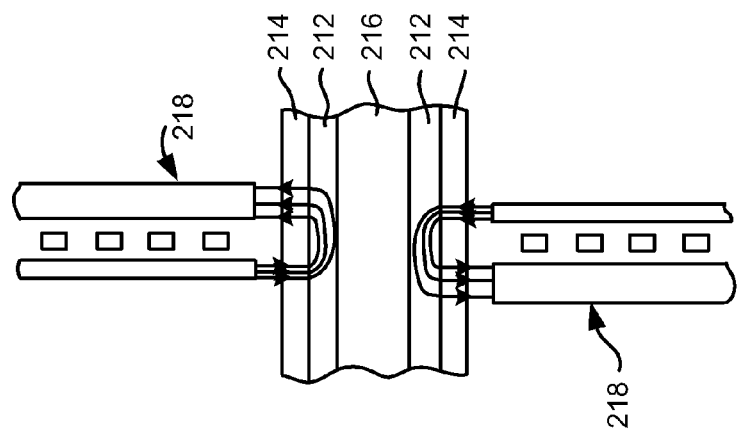
FIG. 2E is a schematic representation of a recording apparatus adapted for recording separately on both sides of the medium.
Figure 2C:
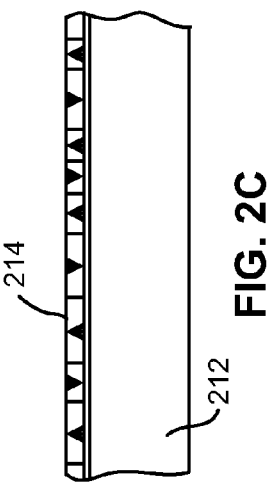
FIG. 2C is a magnetic recording medium utilizing a perpendicular recording format.
Figure 2D:
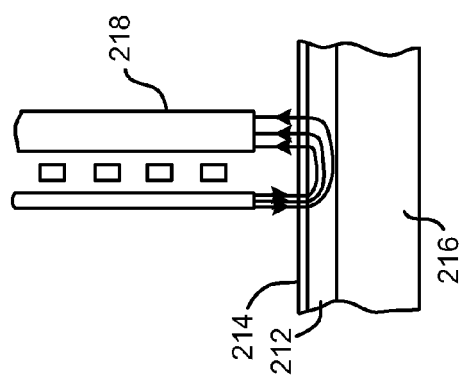
FIG. 2D is a schematic representation of a recording head and recording medium combination for perpendicular recording on one side.
Figure 2A:
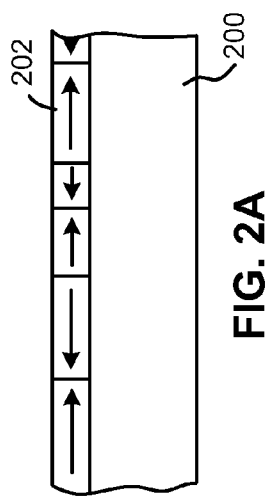
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
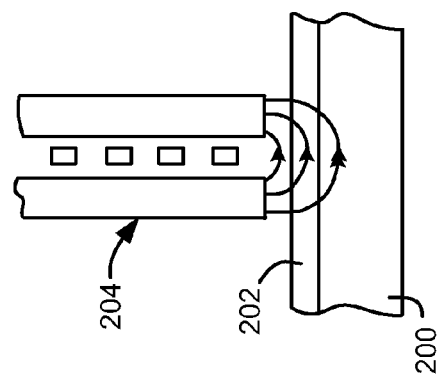
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

FIG. 6A shows a multi-element magnetic read head 60 as seen from a media-facing surface of the head, such as an ABS thereof, according to one embodiment. FIG. 6B shows a side view of the multi-element magnetic read head 60 according to the embodiment.

According to one embodiment, the problems described above in relation to FIGS. 5A-5B may be overcome using the head 60 as shown in FIGS. 6A-6B. This head 60 comprises an insulating layer 14 that is positioned above (but not necessarily directly on) a lower magnetic shield layer 1. A first magnetoresistive (MR) read element 4 and a second MR read element 5 are positioned above (but not necessarily directly on) the insulating layer 14, and a refill layer 6 is positioned on both sides of the first MR read element 4 and on both sides of the second MR read element 5. Furthermore, a portion of the first MR read element 4 and a portion of the second MR read element 5 extend along an element height direction 25 perpendicular to the media-facing surface toward a rear side thereof to connect with back wiring layers 20, which are positioned near rear sides of at least one lower layer of each MR read element 4, 5. The lower layer(s) can be any layer(s) below the reference layer (pinned layer). For example, a lower layer may be a seed layer, an antiferromagnetic layer, etc. Such lower layer may extend beyond the back edge 61 of the free layer (and potentially other layers) of the associated MR element in the element height direction 25. Thus, the back wiring layers 20 are configured to electrically communicate with the associated MR element 4, 5 and configured to separately extract signals from each MR element 4, 5 during a read operation. The magnetic data storage system may include separate processing channels for each of the wiring layers 20, thereby enabling separate processing of signals from each MR element.

Because the head 60 positions the back wiring layers 20 on a rear side of the elements 4, 5, the back wiring layers 20 are not exposed at the media-facing surface of the head 60, which provides additional protection to these layers. This arrangement also allows for a narrowing of the read gap thickness, along with a narrowing of a thickness of the back wiring layers 20. These advancements allow for the head 60 to read data from a magnetic medium having an increased recording density as compared to conventional magnetic media.

In some approaches, a multi-element magnetic read head 60 as shown in FIGS. 6A-6B may be used in a magnetic data storage system. The magnetic data storage system may be similar to that shown in FIG. 1. For example, the magnetic data storage system 100 may comprise at least one magnetic head 121 as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

With reference to FIGS. 7A-7H, a method for manufacturing a multi-element magnetic read head is shown in various states of formation according to one embodiment. This method includes a step for fabricating a lower magnetic shield layer 1, a step for fabricating an insulating layer 14 above the lower magnetic shield layer 1, a step for fabricating a MR film 2 above the insulating layer 14, a step for fabricating a track pattern mask 3 above the MR film 2, a step for etching the MR film 2, a step for laminating a refill layer 6 with a magnetic domain control layer 7 while the track pattern mask 3 is still held in place followed by removing the track pattern mask 3, a step for etching the MR film 2 to a barrier layer in order to fabricate a height pattern mask 13, a step for laminating a height refill layer 21 with the height mask pattern 13 still held in place followed by removing the height mask pattern 13, a step for removing a portion of the height refill layer 21 to fabricate a back wiring layer 20, and a step for fabricating an upper magnetic shield layer 16.

Each step will be described with reference to one or more Figures, each Figure including a view from the media-facing surface of the structure on the left, and a cross-sectional side view of the structure on the right.

Figure 7A:
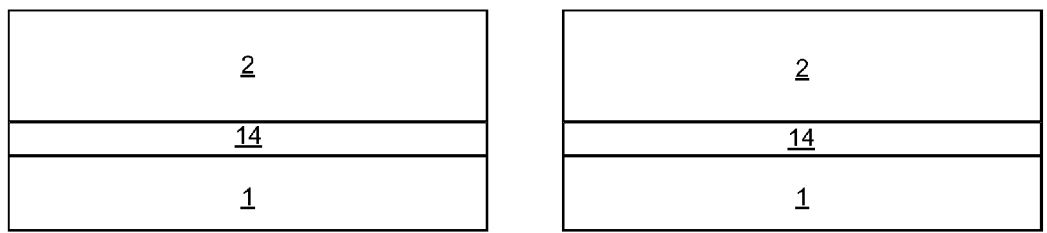
FIGS. 7A-7H show various structures formed in a method for manufacturing a multi-element magnetic head according to one embodiment.

With reference to FIG. 7A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Then, for example, a sputtering method or some other suitable formation technique may be employed to deposit an insulating layer 14 comprising $Al_2O_3$ (alumina) or some other suitable insulting material thereon. The insulating layer 14 may have a thickness, in some approaches, in a range from about 1 nm to about 10 nm, such as about 2 nm.

Next, a sputtering method or some other suitable formation technique may be employed to fabricate a MR film 2 thereabove. The MR film 2 may comprise any layers and materials known in the art. In one example, the MR film 2 may comprise at least a free layer, a barrier layer, and a pinned layer. More specifically, the MR film 2 may comprise, for example, a 1 nm Ta underlayer, a 5 nm IrMn antiferromagnetic (AFM) layer, a 2 nm CoFeB pinned layer, a MgO tunnel insulating film, and a free layer comprising a 5 nm CoFeB/2 nm NiFe laminated film.

Figure 7B:
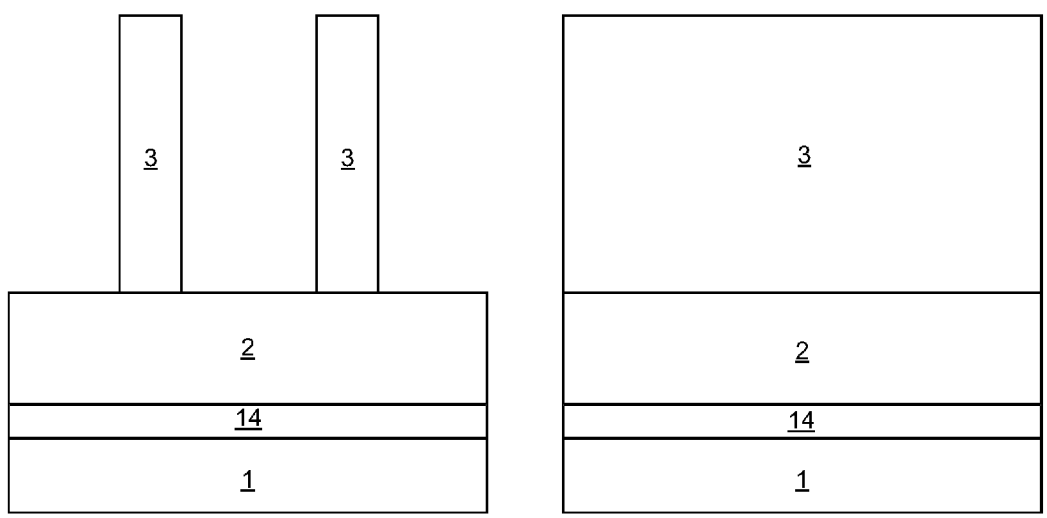

Next, as shown in FIG. 7B, a track pattern mask 3 is provided to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or extreme ultraviolet lithography (EUV) may be utilized, along with a normal exposure and/or double patterning.

Figure 7C:
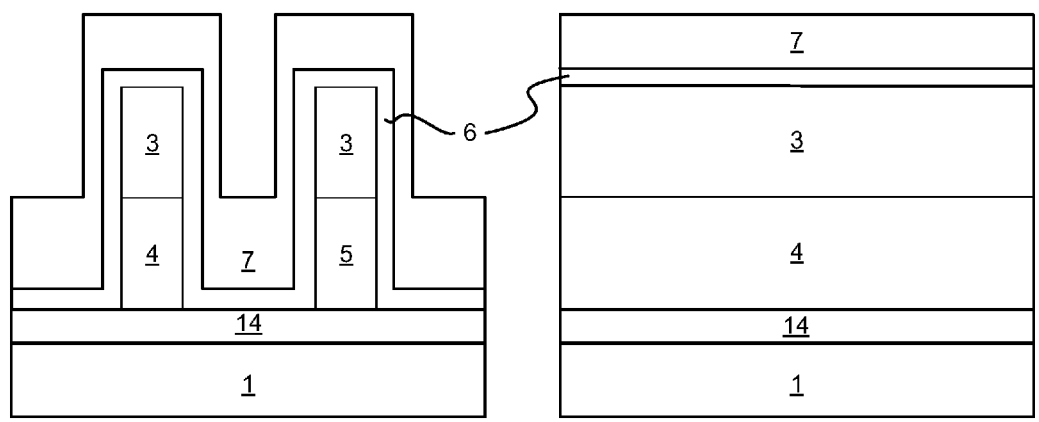

Next, as shown in FIG. 7C, using the track pattern mask 3 as a mask, the MR film 2 is etched using any suitable etching technique known in the art, such as via Ar ion milling, reactive ion etching (RIE), etc., to expose the insulating layer 14 and fabricate a first MR element 4 and a second MR element 5 which comprise portions of the MR film 2 which remains after the etching process. The upper magnetic shield layer 16 is configured to electrically communicate with the MR elements 4, 5, in one embodiment.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic domain control layer 7 is deposited using any suitable deposition method, such as a long throw sputtering (LTS) method having excellent linearity, to a thickness in a range from about 5 nm to about 100 nm, such as about 13 nm. The magnetic domain control layer 7 may comprise any suitable material known in the art, such as CoPt among others.

Figure 7D:
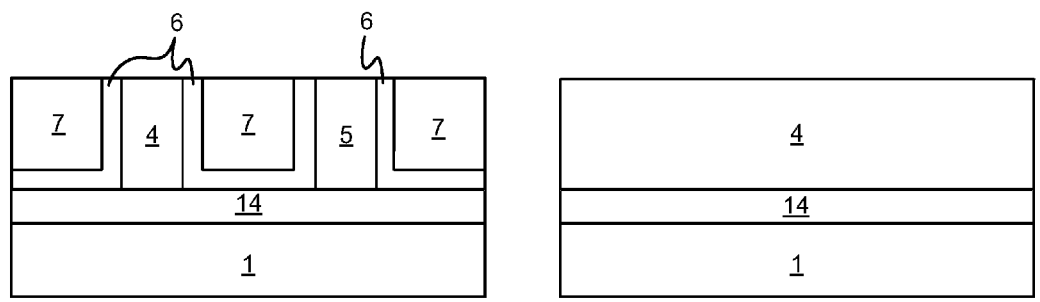

Next, as shown in FIG. 7D, the track pattern mask 3 is removed by lift-off, chemical mechanical polishing (CMP) or some other suitable technique known in the art.

Figure 7E:
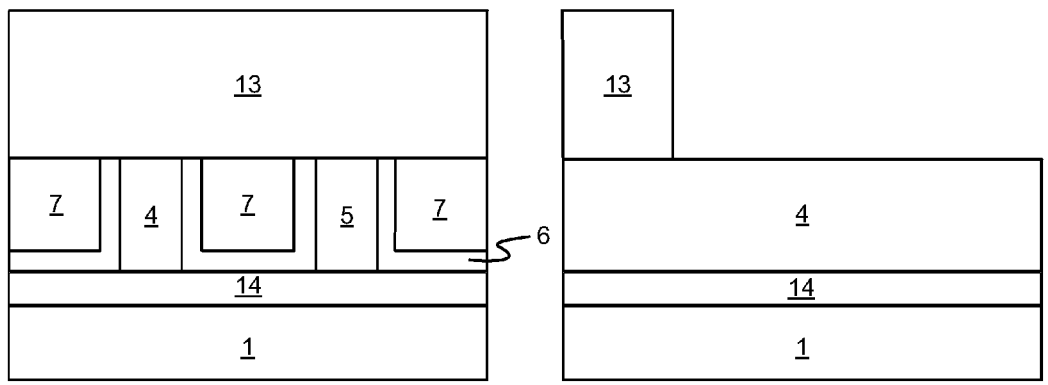

As shown in FIG. 7E, a height mask pattern 13 is provided above the first MR element 4 and the second MR element 5 to establish a height from the media-facing surface in the element height direction in a range from about 50 nm to about 1000 nm, such as about 500 nm. This height mask pattern 13 is used as a mask to etch the magnetic domain control layer 7, the refill layer 6, and the two elements 4, 5 using Ar ion milling, RIE, or some other suitable technique, to expose the pinned layer of the elements 4, 5.

Figure 7F:
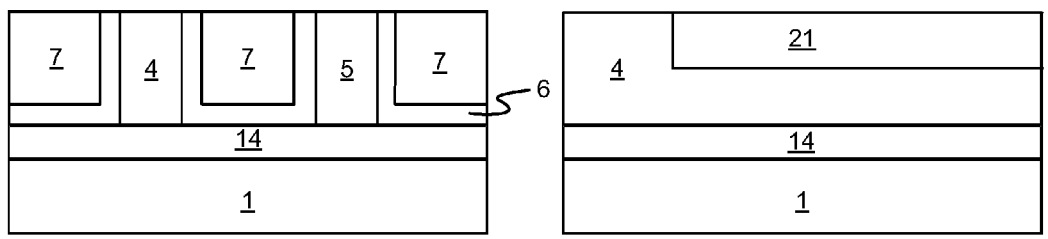

Next, as shown in FIG. 7F, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$. Then the height mask pattern 13 is removed by lift-off, CMP, etc. The refill layer 21 may be formed of the same material as refill layer 6, and may form a continuous refill layer between the various components of the head, in one approach.

Figure 7G:
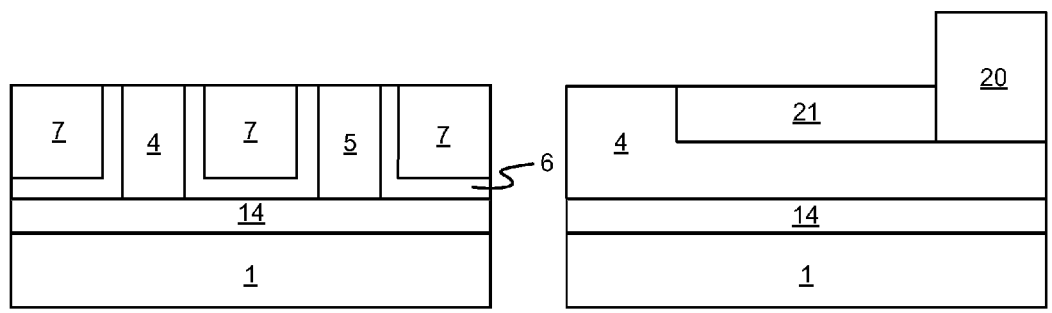

As shown in FIG. 7G, a wiring mask pattern is formed above the structure at the media-facing surface thereof, and some of the height refill layer 21 is removed via etching at a rear end thereof in the element height direction, such as via Ar ion milling. Then, a back wiring layer 20 is formed behind the refill layer 21 in the element height direction using any suitable method known in the art from a suitable conductive material, such as Au, Ag, etc., to a thickness in a range between about 5 nm to about 100 nm.

Figure 7H:
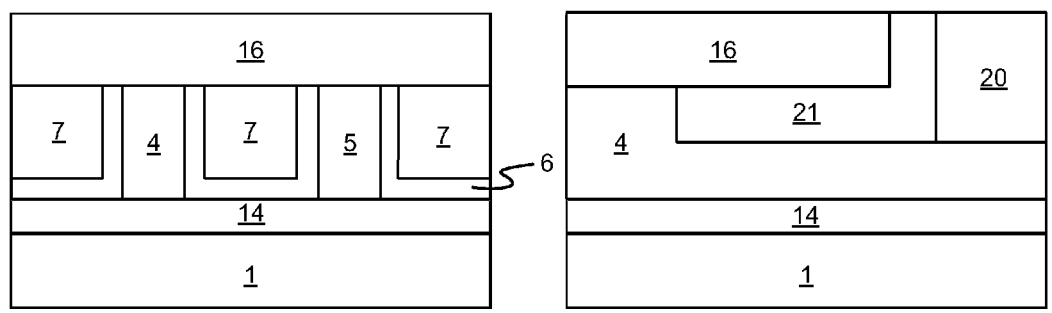

Then, as shown in FIG. 7H, a sputtering method is used to form an upper magnetic shield layer 16 and an additional insulating layer (also labeled as 21) between the back wiring layer 20 and the upper magnetic shield layer 16. Any suitable materials may be used for the upper magnetic shield layer 16 and additional insulating layer as known in the art.

The method described in FIGS. 7A-7H is representative of the formation of one embodiment of a multi-element magnetic head. Although two elements 4, 5 are shown, it is possible to form more than two elements in each read head, as would be understood by one of skill in the art, such as three four, 10, 16, 24, 32, etc.

According to another embodiment, a magnetic head may be formed in accordance with a method described with reference to FIGS. 8A-8H.

Figure 8A:
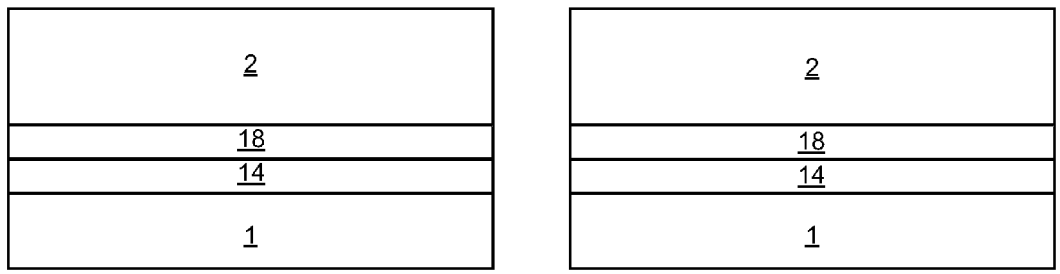
FIGS. 8A-8H show various structures formed in a method for manufacturing a multi-element magnetic head according to another embodiment.

As shown in FIG. 8A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Then, for example, a sputtering method or some other suitable formation technique may be employed to deposit an insulating layer 14 comprising alumina or some other suitable insulting material thereon. The insulating layer 14 may have a thickness, in some approaches, in a range from about 1 nm to about 10 nm, such as about 2 nm. Next, wiring underlayer 18 is formed using any suitable formation technique known in the art, such as sputtering, to a thickness of between about 1 nm and about 10 nm, for example, 5 nm, which may comprise any suitable material, such as Cr.

Next, a sputtering method or some other suitable formation technique may be employed to fabricate a MR film 2 thereabove. The MR film 2 may comprise any layers and materials known in the art. In one example, the MR film 2 may comprise at least a free layer, a barrier layer, and a pinned layer. More specifically, the MR film 2 may comprise, for example, a 1 nm Ta underlayer, a 5 nm IrMn AFM layer, a 2 nm CoFeB pinned layer, a MgO tunnel insulating film, and a free layer comprising a 5 nm CoFeB/2 nm NiFe laminated film.

Figure 8B:
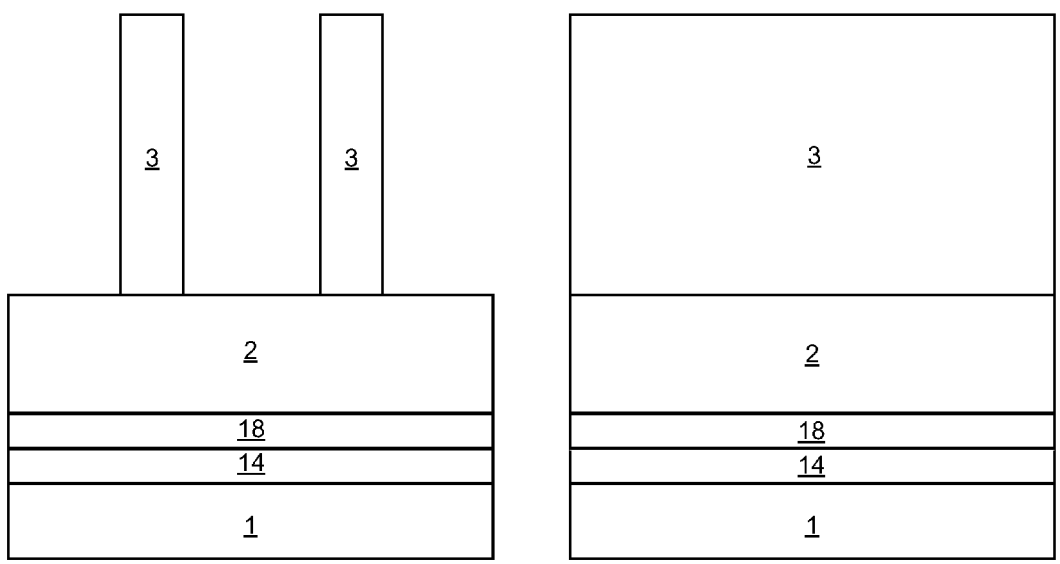

Next, as shown in FIG. 8B, a track pattern mask 3 is provided to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or EUV may be utilized, along with a normal exposure and/or double patterning.

Figure 8C:
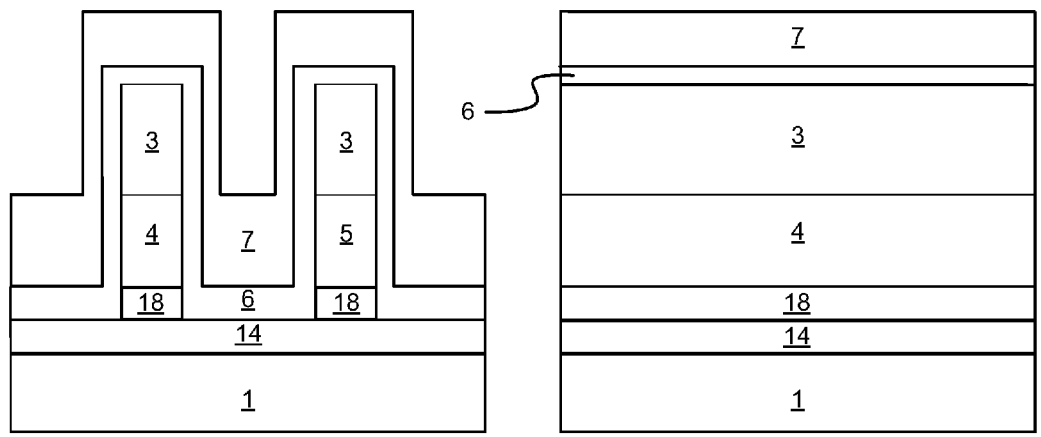

Next, as shown in FIG. 8C, using the track pattern mask 3 as a mask, the MR film 2 is etched using any suitable etching technique known in the art, such as via Ar ion milling, RIE, etc., to expose the insulating layer 14 and fabricate a first MR element 4 and a second MR element 5 which comprise portions of the MR film 2 which remains after the etching process.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic domain control layer 7 is deposited using any suitable deposition method, such as a LTS method having excellent linearity, to a thickness in a range from about 5 nm to about 100 nm, such as about 13 nm. The magnetic domain control layer 7 may comprise any suitable material known in the art, such as CoPt among others.

Figure 8D:
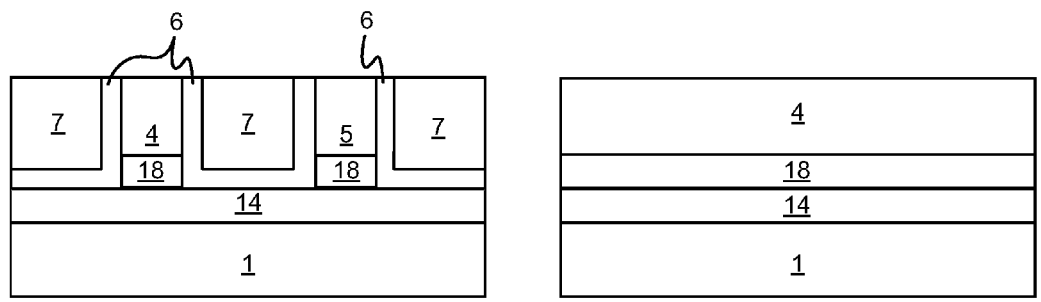

Next, as shown in FIG. 8D, the track pattern mask 3 is removed by lift-off, CMP or some other suitable technique known in the art.

Figure 8E:
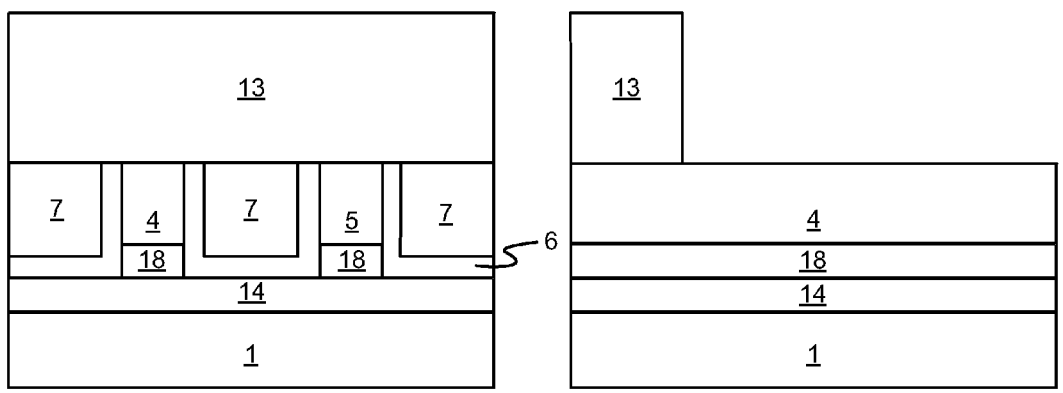

As shown in FIG. 8E, a height mask pattern 13 is provided above the first MR element 4 and the second MR element 5 to establish a height from the media-facing surface in the element height direction in a range from about 50 nm to about 1000 nm, such as about 500 nm. This height mask pattern 13 is used as a mask to etch the magnetic domain control layer 7, the refill layer 6, and the two elements 4, 5 using Ar ion milling, RIE, or some other suitable technique, to expose the pinned layer of the elements 4, 5.

Figure 8F:
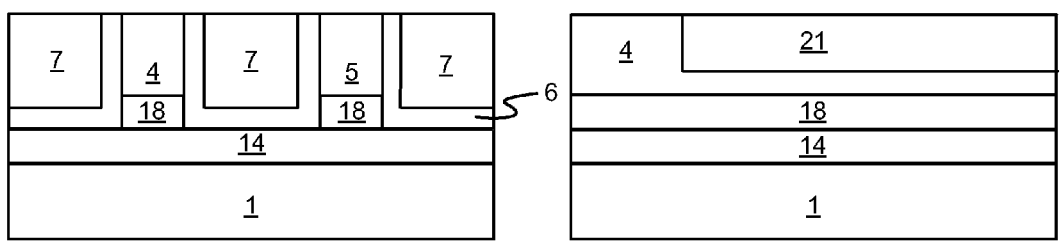

Next, as shown in FIG. 8F, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$. Then the height mask pattern 13 is removed by lift-off, CMP, etc.

Figure 8G:
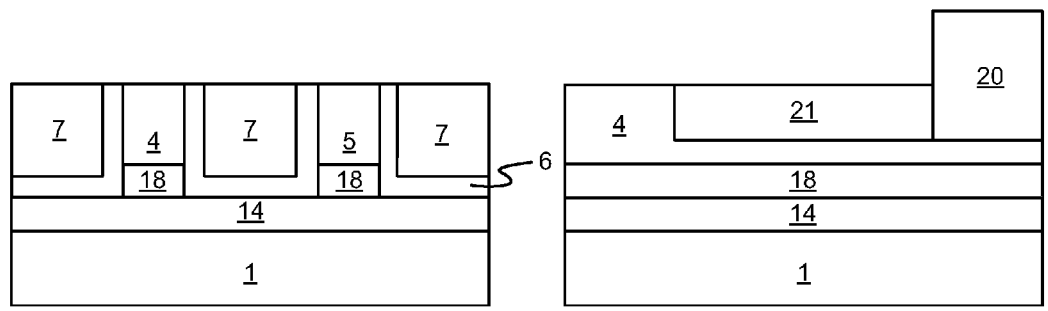

As shown in FIG. 8G, a wiring mask pattern is formed above the structure at the media-facing surface thereof, and some of the height refill layer 21 is removed via etching at a rear end thereof in the element height direction, such as via Ar ion milling. Then, a back wiring layer 20 is formed behind the refill layer 21 in the element height direction using any suitable method known in the art from a suitable conductive material, such as Au, Ag, etc., to a thickness in a range between about 5 nm to about 120 nm, such as about 100 nm.

Figure 8H:
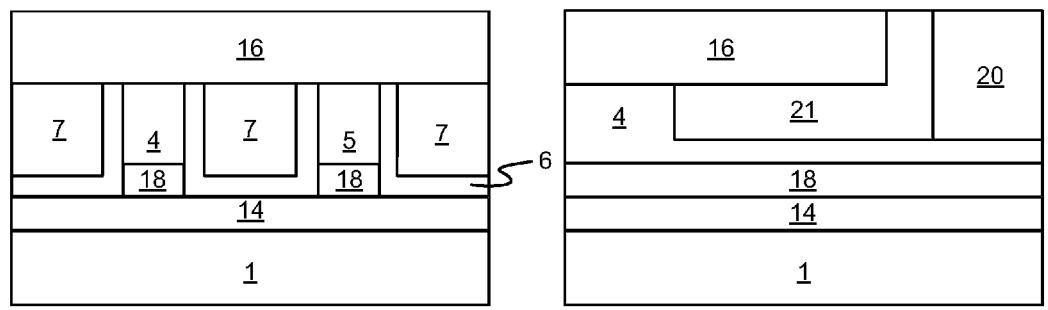

Then, as shown in FIG. 8H, a sputtering method is used to form an upper magnetic shield layer 16 and an additional insulating layer (also labeled as 21) between the back wiring layer 20 and the upper magnetic shield layer 16.

The method described in FIGS. 8A-8H is representative of the formation of one embodiment of a multi-element magnetic head. Although two elements 4, 5 are shown, it is possible to form more than two elements in each read head, as would be understood by one of skill in the art, such as three four, 10, 16, 24, 32, etc.

According to another embodiment, a magnetic head may be formed in accordance with another method, described with reference to FIGS. 9A-9H.

Figure 9A:
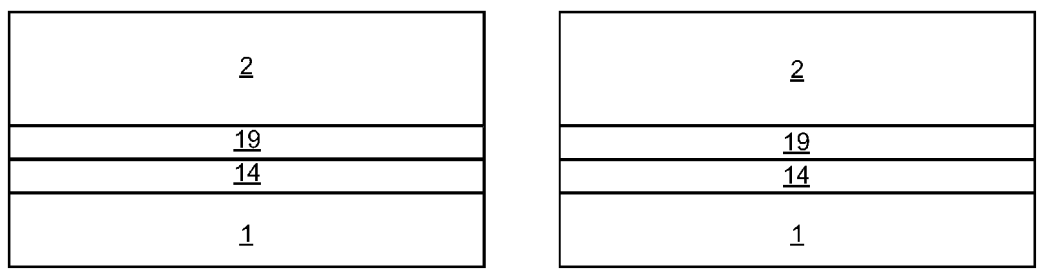
FIGS. 9A-9H show various structures formed in a method for manufacturing a multi-element magnetic head according to yet another embodiment.

As shown in FIG. 9A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Then, for example, a sputtering method or some other suitable formation technique may be employed to deposit an insulating layer 14 comprising alumina or some other suitable insulting material thereon. The insulating layer 14 may have a thickness, in some approaches, in a range from about 1 nm to about 10 nm, such as about 2 nm. Next, a soft magnetic shield wiring underlayer 19 is formed using any suitable formation technique known in the art, such as sputtering, to a thickness of between about 1 nm and about 10 nm, for example, 5 nm, which may comprise any suitable material, such as NiFe, CoFe, etc.

Next, a sputtering method or some other suitable formation technique may be employed to fabricate a MR film 2 thereabove. The MR film 2 may comprise any layers materials known in the art. In one example, the MR film 2 may comprise at least a free layer, a barrier layer, and a pinned layer. More specifically, the MR film 2 may comprise, for example, a 1 nm Ta underlayer, a 5 nm IrMn AFM layer, a 2 nm CoFeB pinned layer, a MgO tunnel insulating film, and a free layer comprising a 5 nm CoFeB/2 nm NiFe laminated film.

Figure 9B:
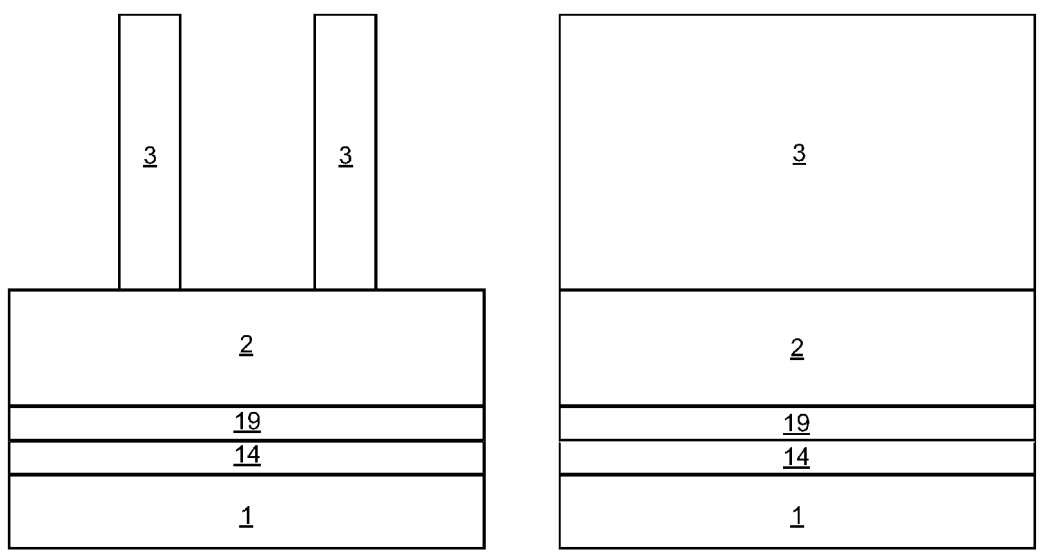

Next, as shown in FIG. 9B, a track pattern mask 3 is provided to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or EUV may be utilized, along with a normal exposure and/or double patterning.

Figure 9C:
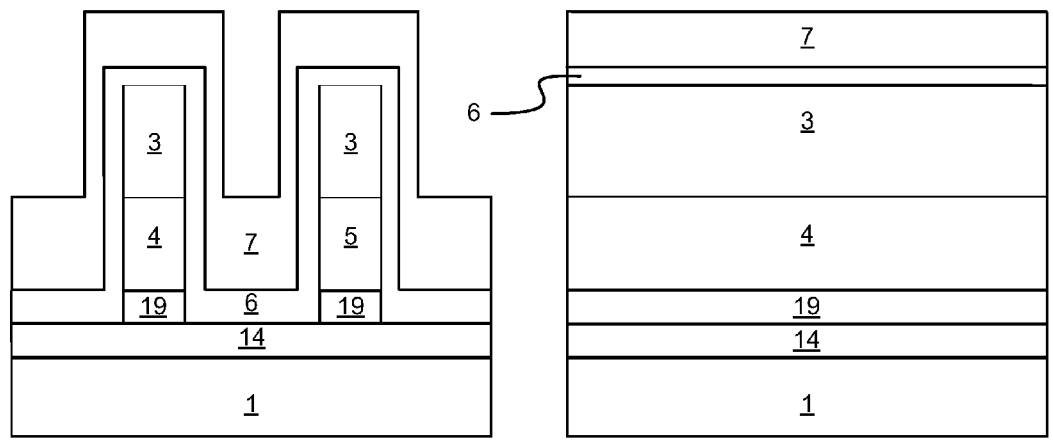

Next, as shown in FIG. 9C, using the track pattern mask 3 as a mask, the MR film 2 is etched using any suitable etching technique known in the art, such as via Ar ion milling, RIE, etc., to expose the insulating layer 14 and fabricate a first MR element 4 and a second MR element 5 which comprise portions of the MR film 2 which remains after the etching process.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic domain control layer 7 is deposited using any suitable deposition method, such as a LTS method having excellent linearity, to a thickness in a range from about 5 nm to about 100 nm, such as about 13 nm. The magnetic domain control layer 7 may comprise any suitable material known in the art, such as CoPt among others.

Figure 9D:
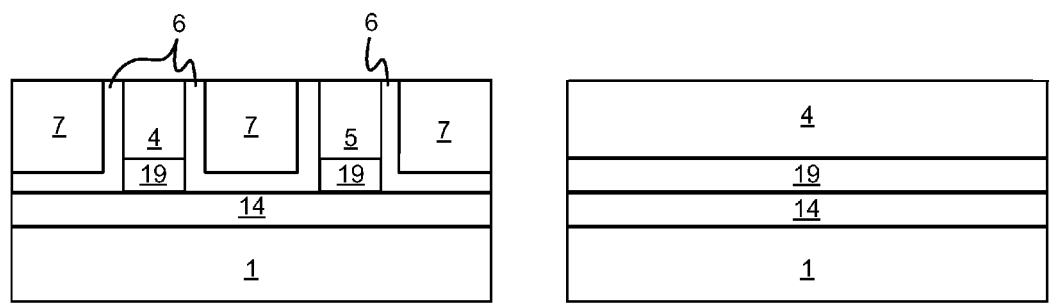

Next, as shown in FIG. 9D, the track pattern mask 3 is removed by lift-off, CMP or some other suitable technique known in the art.

Figure 9E:
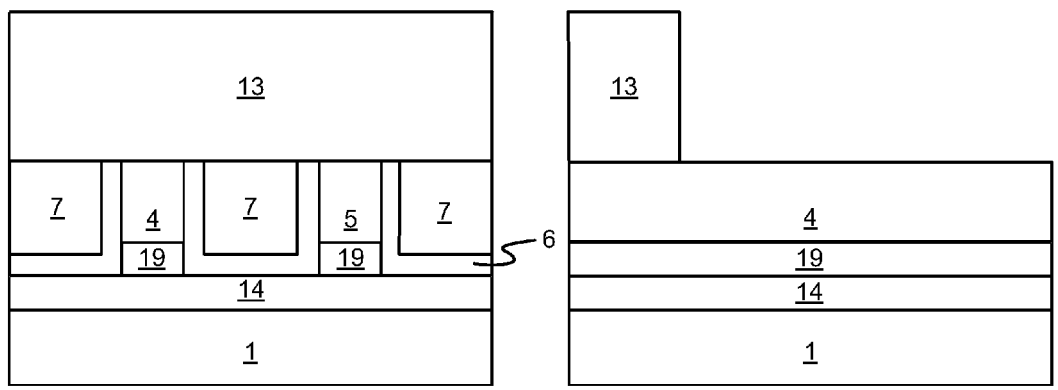

As shown in FIG. 9E, a height mask pattern 13 is provided above the first MR element 4 and the second MR element 5 to establish a height from the media-facing surface in the element height direction in a range from about 50 nm to about 1000 nm, such as about 500 nm. This height mask pattern 13 is used as a mask to etch the magnetic domain control layer 7, the refill layer 6, and the two elements 4, 5 using Ar ion milling, RIE, or some other suitable technique, to expose the pinned layer of the elements 4, 5.

Figure 9F:
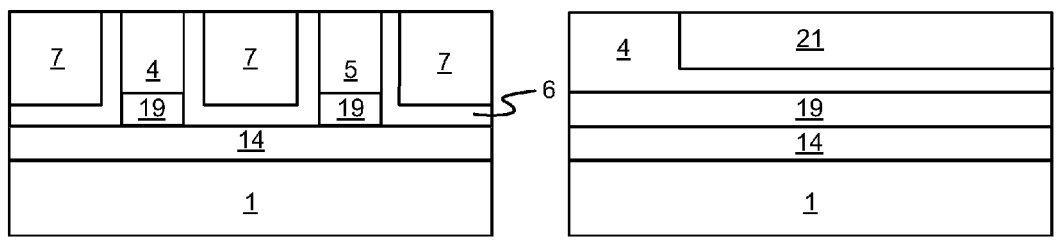

Next, as shown in FIG. 9F, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$. Then the height mask pattern 13 is removed by lift-off, CMP, etc.

Figure 9G:
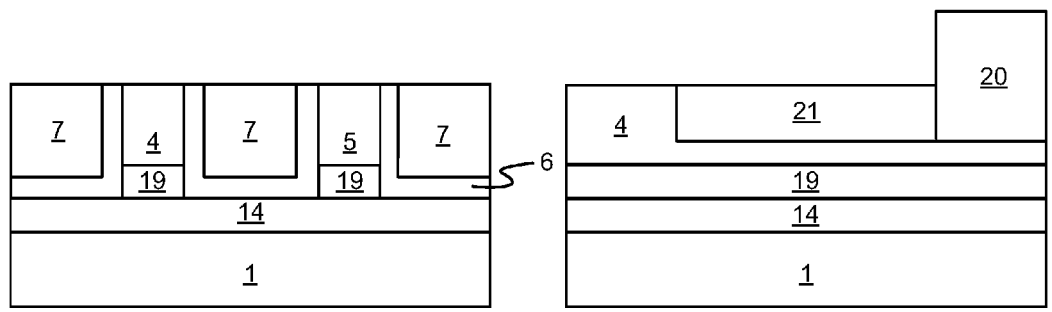

As shown in FIG. 9G, a wiring mask pattern is formed above the structure at the media-facing surface thereof, and some of the height refill layer 21 is removed via etching at a rear end thereof in the element height direction, such as via Ar ion milling. Then, a back wiring layer 20 is formed behind the refill layer 21 in the element height direction using any suitable method known in the art from a suitable conductive material, such as Au, Ag, etc., to a thickness in a range between about 5 nm to about 120 nm, such as about 100 nm. The back wiring layer 20 is configured to electrically communicate with the MR elements 4, 5, in one embodiment.

Figure 9H:
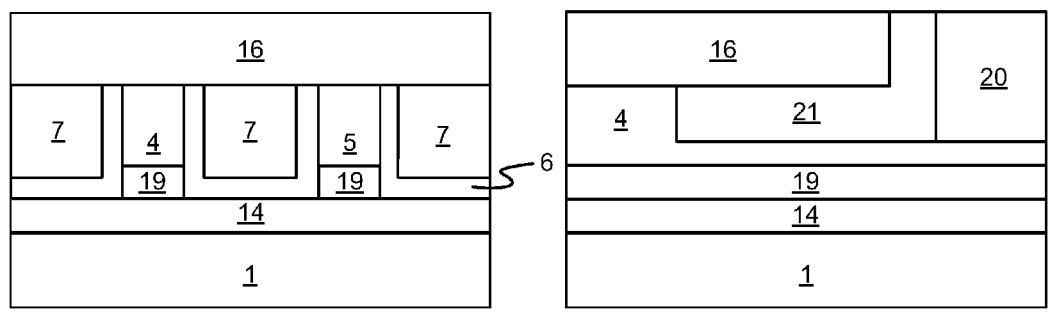

Then, as shown in FIG. 9H, a sputtering method is used to form an upper magnetic shield layer 16 and an additional insulating layer (also labeled as 21) between the back wiring layer 20 and the upper magnetic shield layer 16.

The method described in FIGS. 9A-9H is representative of the formation of one embodiment of a multi-element magnetic head. Although two elements 4, 5 are shown, it is possible to form more than two elements in each read head, as would be understood by one of skill in the art, such as three four, 10, 16, 24, 32, etc.

According to another embodiment, a magnetic head may be formed in accordance with another method, described with reference to FIGS. 10A-10G.

Figure 10A:
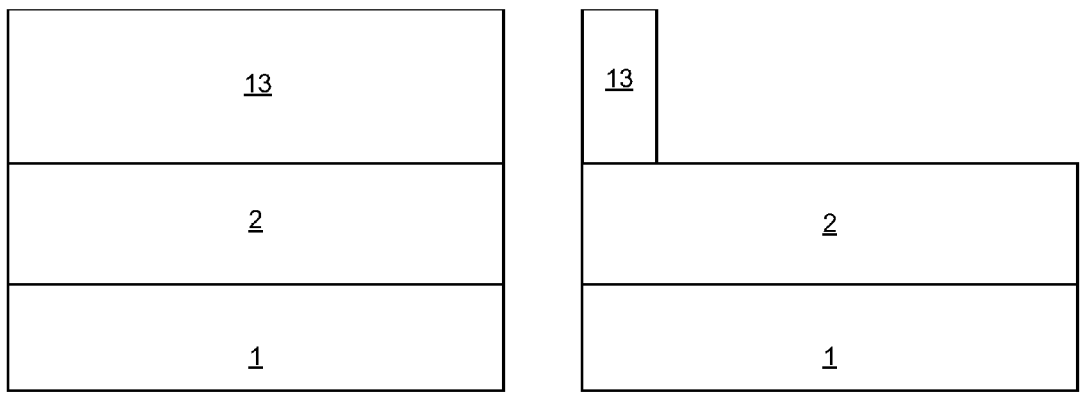
FIGS. 10A-10G show various structures formed in a method for manufacturing a multi-element magnetic head in another embodiment.

As shown in FIG. 10A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Next, a sputtering method or some other suitable formation technique may be employed to fabricate a MR film 2 thereabove. In one approach, an insulating film (not shown) may be provided between the MR film 2 and the lower magnetic shield layer 1, the insulating film comprising alumina and having a thickness between about 1 nm and about 10 nm, such as about 2 nm, in one approach. The MR film 2 may comprise any layers and materials known in the art. In one example, the MR film 2 may comprise at least a free layer, a barrier layer, and a pinned layer. More specifically, the MR film 2 may comprise, for example, a 1 nm Ta underlayer, a 5 nm IrMn AFM layer, a 2 nm CoFeB pinned layer, a MgO tunnel insulating film, and a free layer comprising a 5 nm CoFeB/2 nm NiFe laminated film.

Then, a height mask pattern 13 is provided above the MR film 2 to establish a height from the media-facing surface in the element height direction in a range from about 50 nm to about 1000 nm, such as about 500 nm. This height mask pattern 13 is used as a mask to etch the MR film 2 using Ar ion milling, RIE, or some other suitable technique, to expose the lower magnetic shield layer 1.

Next, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$.

Figure 10B:
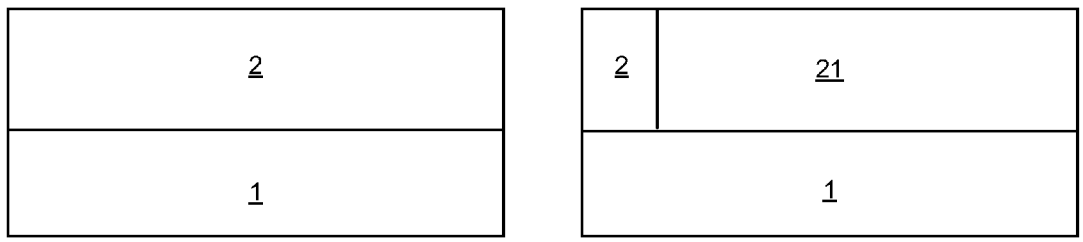

Then, as shown in FIG. 10B, the height mask pattern 13 is removed by lift-off, CMP, etc.

Figure 10C:
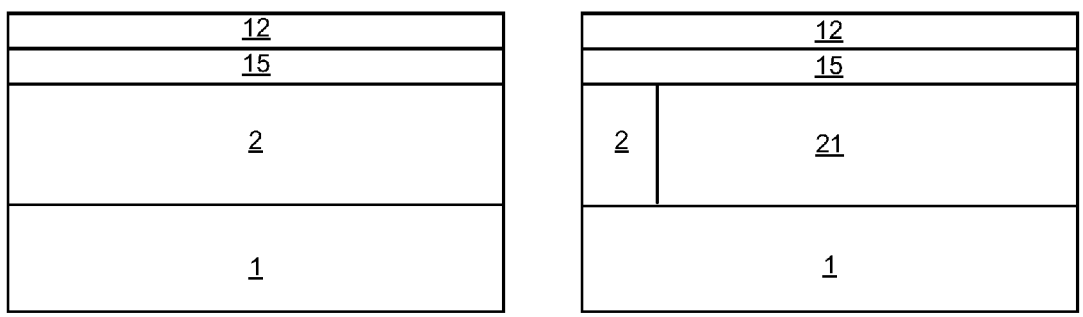

Next, as shown in FIG. 10C, an upper wiring layer 15 comprising any suitable material known in the art is deposited using any known technique, such as sputtering, in a thickness from about 1 nm to about 10 nm, such as about 5 nm. The upper wiring layer 15 may comprise Cr or the like, or NiFe, CoFe, etc. to allow the layer to also be used as a magnetic shield layer and a wiring layer. Next, an upper insulating film 12 is formed above the upper wiring layer 15 using any known formation technique, such as sputtering, to a thickness of about 1 nm to about 10 nm, such as about 2 nm. The upper insulating film 12 may comprise any suitable insulating material, such as $Al_2O_3$, MgO, etc.

Figure 10D:
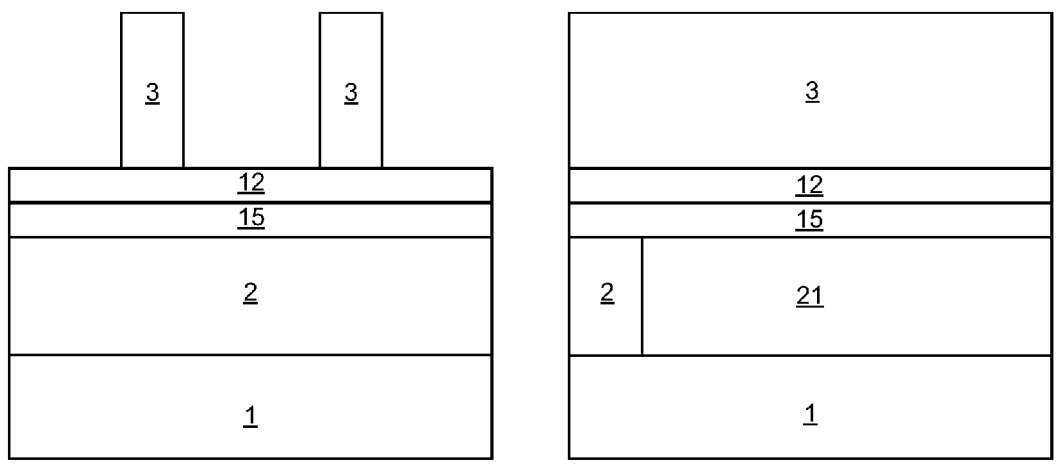

Moreover, as shown in FIG. 10D, a track pattern mask 3 is provided above the upper insulating film 12 to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or EUV may be utilized, along with a normal exposure and/or double patterning. In this approach, the track pattern mask 3 may be employed as a height direction wiring pattern.

Figure 10E:
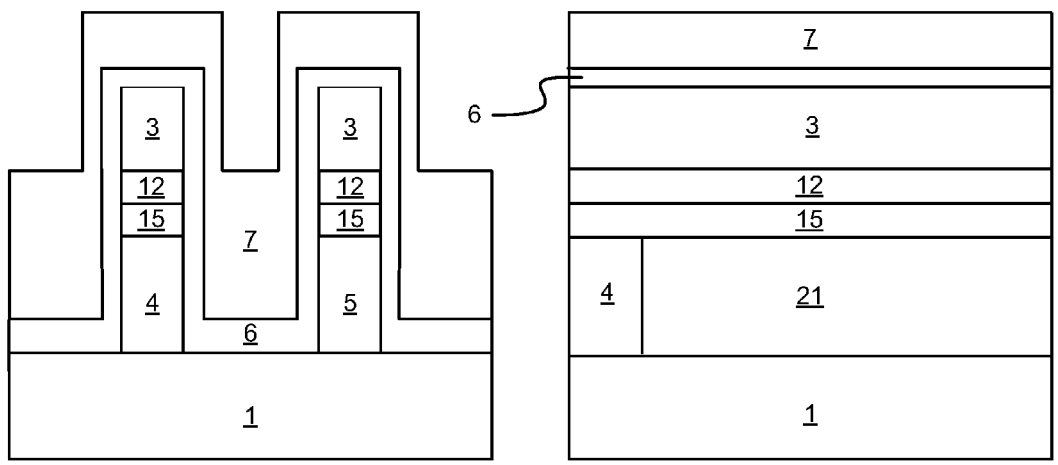

Next, as shown in FIG. 10E, using the track pattern mask 3 as a mask, the MR film 2 is etched using any suitable etching technique known in the art, such as via Ar ion milling, reactive ion etching (RIE), etc., to expose the lower magnetic shield layer 1 (or insulating layer that is not shown) and fabricate a first MR element 4 and a second MR element 5 which comprise portions of the MR film 2 which remains after the etching process.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic domain control layer 7 is deposited using any suitable deposition method, such as a LTS method having excellent linearity, to a thickness in a range from about 5 nm to about 100 nm, such as about 13 nm. The magnetic domain control layer 7 may comprise any suitable material known in the art, such as CoPt among others.

Figure 10F:
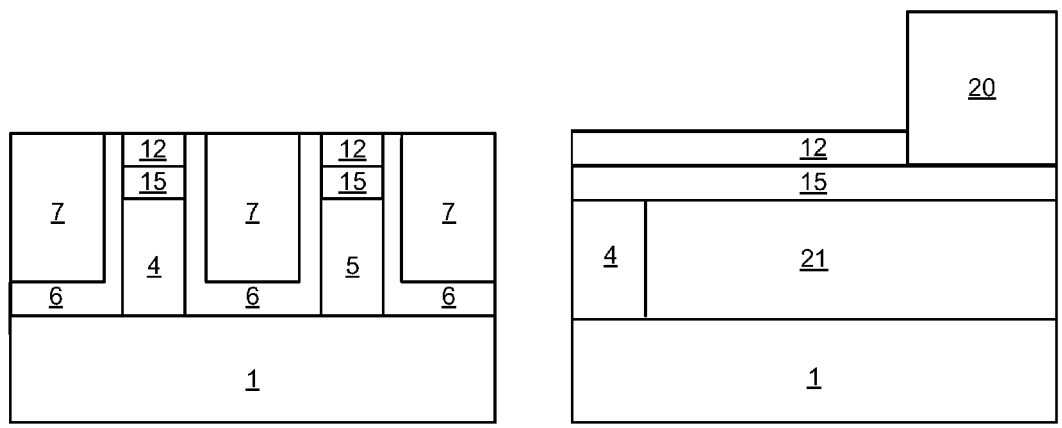

Next, as shown in FIG. 10F, the track pattern mask 3 is removed by lift-off, CMP or some other suitable technique known in the art. Then, a wiring mask pattern is provided above the first MR element 4 and the second MR element 5 to establish a height from the media-facing surface in the element height direction in a range from about 50 nm to about 1000 nm, such as about 500 nm. This wiring mask pattern is used to form a back wiring layer 20 behind the upper insulating film 12 in the element height direction using any suitable method known in the art from a suitable conductive material, such as Au, Ag, etc., to a thickness in a range between about 5 nm to about 120 nm, such as about 100 nm. The upper wiring layer 15 is configured to electrically communicate with the back wiring layer 20 in one embodiment. Also, the back wiring layer 20 is configured to electrically communicate with the MR elements 4, 5, in another embodiment.

Figure 10G:
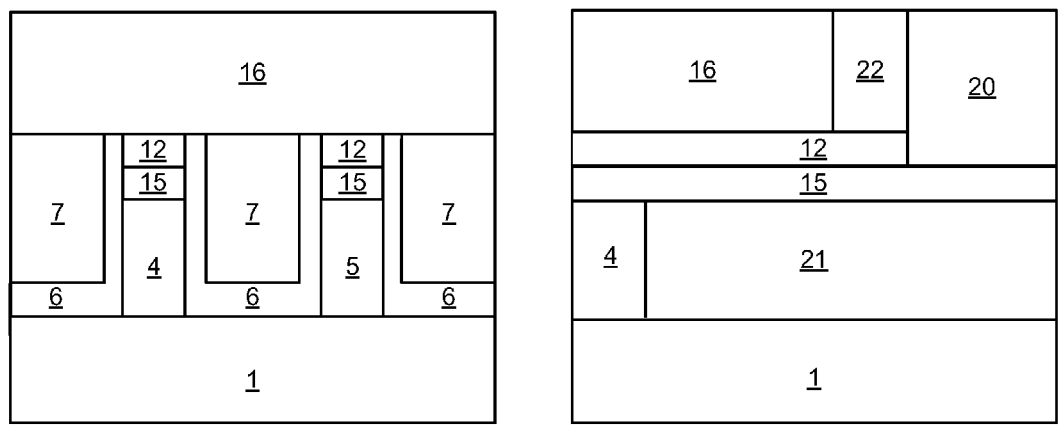

Then, as shown in FIG. 10G, a sputtering method is used to form an upper magnetic shield layer 16 and a wire separation insulating layer 22 between the back wiring layer 20 and the upper magnetic shield layer 16. Any suitable material as known in the art may be used for the upper magnetic shield layer 16, such as NiFe, CoFe, etc., and the wire separation insulating layer 22, such as alumina, MgO, etc.

The method described in FIGS. 10A-10G is representative of the formation of one embodiment of a multi-element magnetic head. Although two elements 4, 5 are shown, it is possible to form more than two elements in each read head, as would be understood by one of skill in the art, such as three four, 10, 16, 24, 32, etc.

According to another embodiment, a magnetic head may be formed in accordance with another method, described with reference to FIGS. 11A-11G.

Figure 11A:
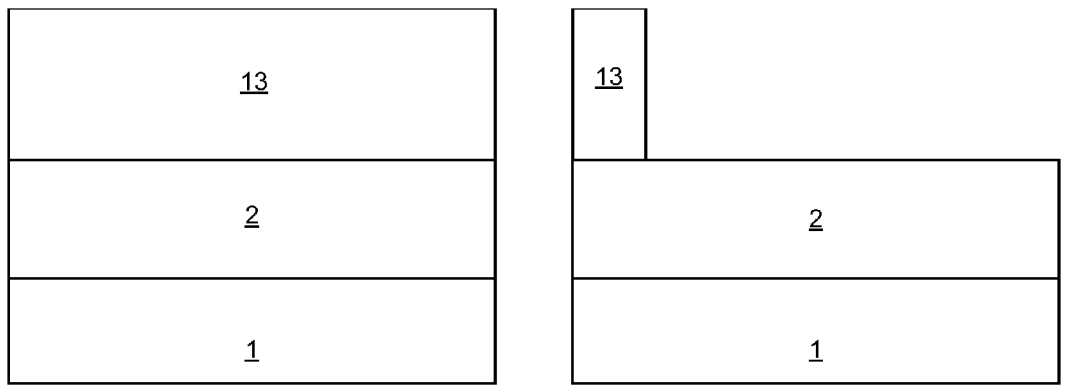
FIGS. 11A-11G show various structures formed in a method for manufacturing a multi-element magnetic head according to another embodiment.

As shown in FIG. 11A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Next, a sputtering method or some other suitable formation technique may be employed to fabricate a MR film 2 thereabove. In one approach, an insulating film (not shown) may be provided between the MR film 2 and the lower magnetic shield layer 1, the insulating film comprising alumina and having a thickness between about 1 nm and about 10 nm, such as about 2 nm, in one approach. The MR film 2 may comprise any layers and materials known in the art. In one example, the MR film 2 may comprise at least a free layer, a barrier layer, and a pinned layer. More specifically, the MR film 2 may comprise, for example, a 1 nm Ta underlayer, a 5 nm IrMn antiferromagnetic (AFM) layer, a 2 nm CoFeB pinned layer, a MgO tunnel insulating film, and a free layer comprising a 5 nm CoFeB/2 nm NiFe laminated film.

Then, a height mask pattern 13 is provided above the MR film 2 to establish a height from the media-facing surface in the element height direction in a range from about 50 nm to about 1100 nm, such as about 500 nm. This height mask pattern 13 is used as a mask to etch the MR film 2 using Ar ion milling, RIE, or some other suitable technique, to expose the lower magnetic shield layer 1.

Next, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$.

Figure 11B:
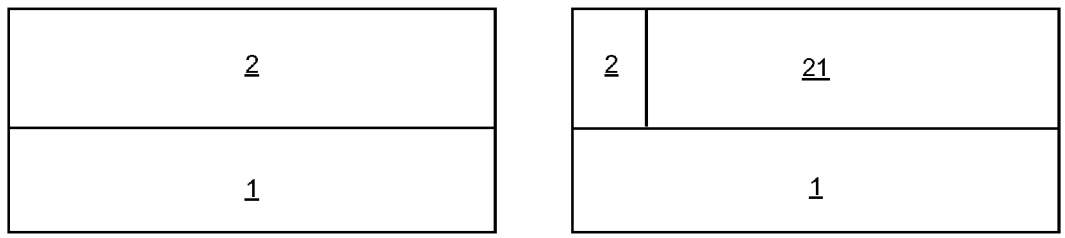

Then, as shown in FIG. 11B, the height mask pattern 13 is removed by lift-off, CMP, etc.

Figure 11C:
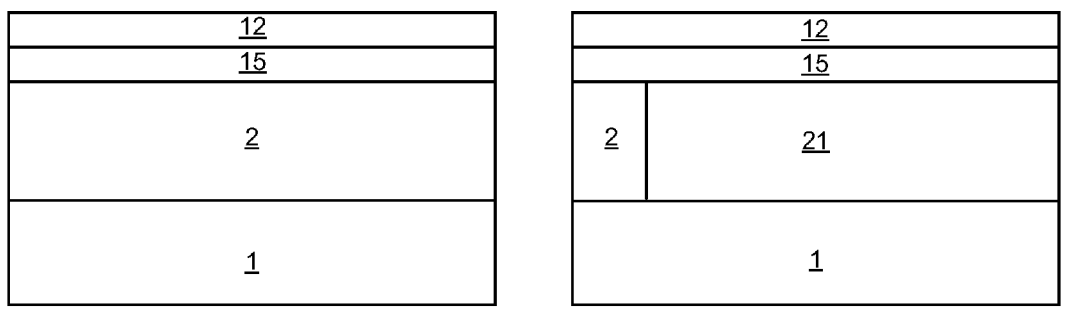

Next, as shown in FIG. 11C, an upper wiring layer 15 comprising any suitable material known in the art is deposited using any known technique, such as sputtering, in a thickness from about 1 nm to about 10 nm, such as about 5 nm. The upper wiring layer 15 may comprise Cr or the like, or NiFe, CoFe, etc. to allow the layer to also be used as a magnetic shield layer and a wiring layer. Next, an upper insulating film 12 is formed above the upper wiring layer 15 using any known formation technique, such as sputtering, to a thickness of about 1 nm to about 10 nm, such as about 2 nm. The upper insulating film 12 may comprise any suitable insulating material, such as $Al_2O_3$, MgO, etc.

Figure 11D:
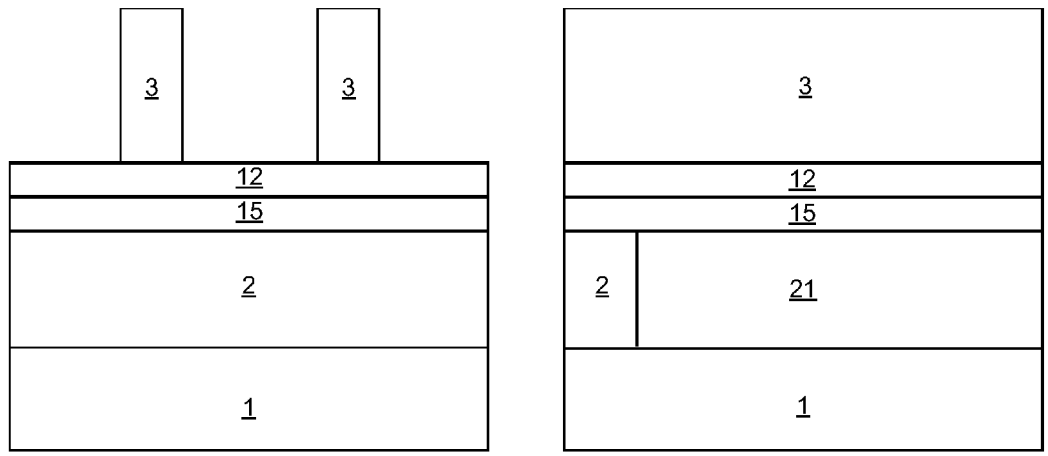

Moreover, as shown in FIG. 11D, a track pattern mask 3 is provided to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or EUV may be utilized, along with a normal exposure and/or double patterning. In this approach, the track pattern mask 3 may be employed as a height direction wiring pattern.

Figure 11E:
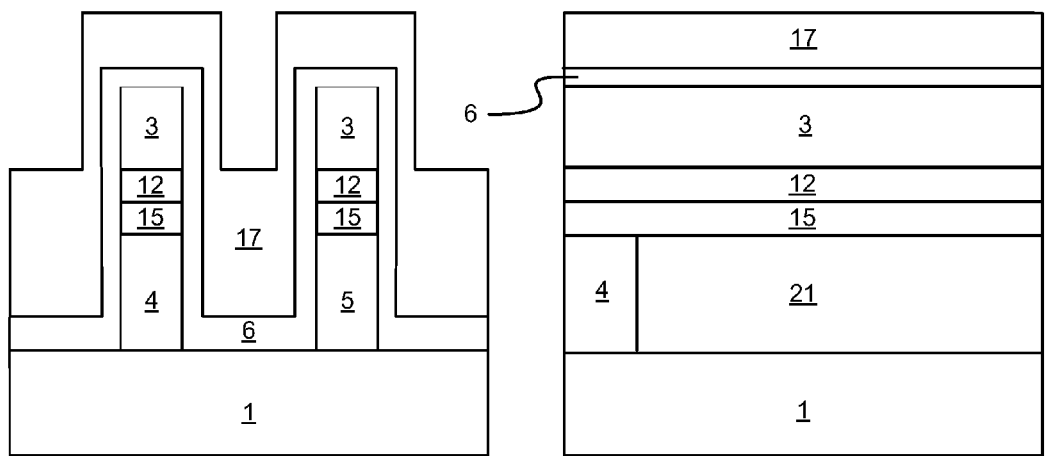

Next, as shown in FIG. 11E, using the track pattern mask 3 as a mask, the MR film 2 is etched using any suitable etching technique known in the art, such as via Ar ion milling, RIE, etc., to expose the lower magnetic shield layer 1 (or insulating layer that is not shown) and fabricate a first MR element 4 and a second MR element 5 which comprise portions of the MR film 2 which remains after the etching process.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic side shield layer 17 is deposited using any suitable deposition method, such as a LTS method having excellent linearity, to a thickness in a range from about 5 nm to about 100 nm, such as about 13 nm. The magnetic side shield layer 17 may comprise any suitable material known in the art, such as NiFe among others.

Figure 11F:
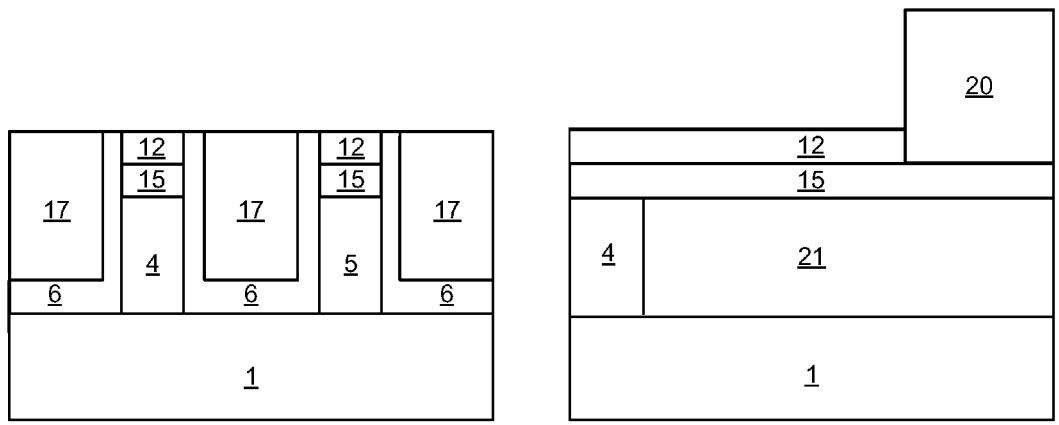

Next, as shown in FIG. 11F, the track pattern mask 3 is removed by lift-off, CMP or some other suitable technique known in the art. Then, a wiring mask pattern is provided above the first MR element 4 and the second MR element 5 to establish a height from the media-facing surface in the element height direction in a range from about 50 nm to about 1100 nm, such as about 500 nm. This wiring mask pattern is used to form a back wiring layer 20 behind the upper insulating film 12 in the element height direction using any suitable method known in the art from a suitable conductive material, such as Au, Ag, etc., to a thickness in a range between about 5 nm to about 120 nm, such as about 100 nm.

Figure 11G:
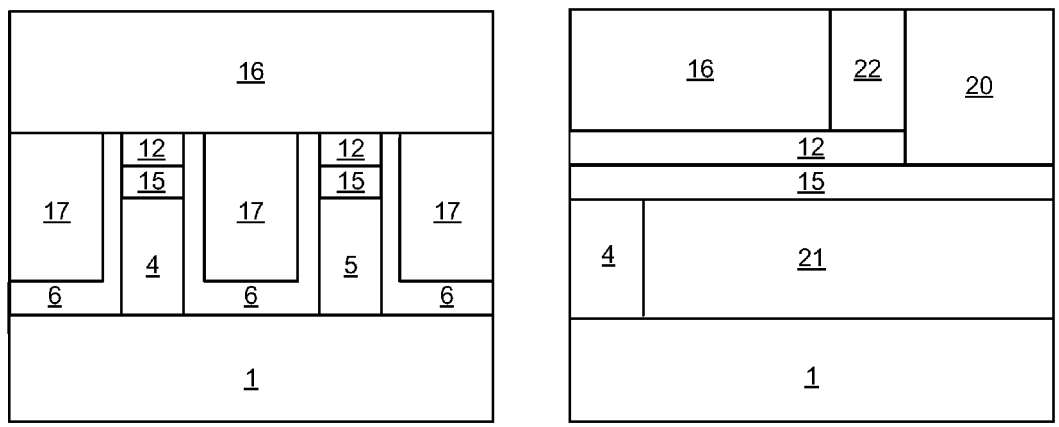

Then, as shown in FIG. 11G, a sputtering method is used to form an upper magnetic shield layer 16 and a wire separation insulating layer 22 between the back wiring layer 20 and the upper magnetic shield layer 16. Any suitable material as known in the art may be used for the upper magnetic shield layer 16, such as NiFe, CoFe, etc., and the wire separation insulating layer 22, such as alumina, MgO, etc.

The method described in FIGS. 11A-11G is representative of the formation of one embodiment of a multi-element magnetic head. Although two elements 4, 5 are shown, it is possible to form more than two elements in each read head, as would be understood by one of skill in the art, such as three four, 10, 16, 24, 32, etc.

According to another embodiment, a magnetic head may be formed in accordance with another method, described with reference to FIGS. 12A-12G.

Figure 12A:
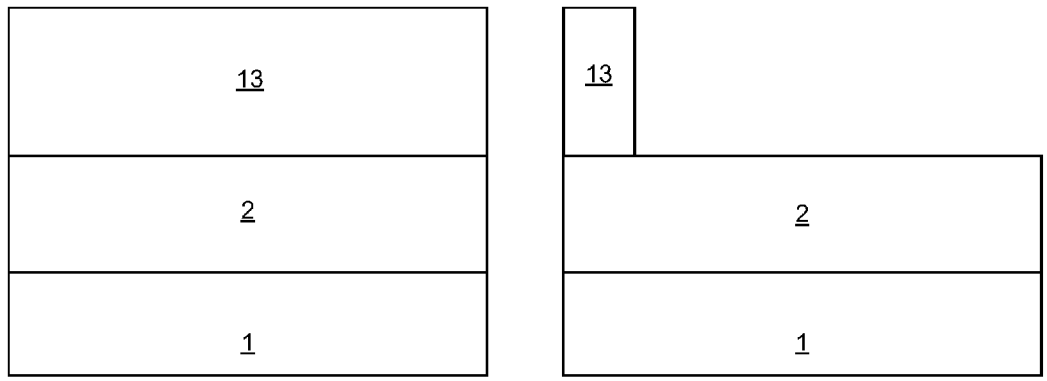
FIGS. 12A-12G show various structures formed in a method for manufacturing a multi-element magnetic head according to another embodiment.

As shown in FIG. 12A, a lower magnetic shield layer 1 comprising NiFe, CoFe, or some other suitable material known in the art is provided. The lower magnetic shield layer 1 may be provided by way of a film of $Al_2O_3$, MgO, etc., on an $Al_2O_3$—TiC wafer serving as a base body of a slider (not shown in the Figures). Next, a sputtering method or some other suitable formation technique may be employed to fabricate a MR film 2 thereabove. In one approach, an insulating film (not shown) may be provided between the MR film 2 and the lower magnetic shield layer 1, the insulating film comprising alumina and having a thickness between about 1 nm and about 10 nm, such as about 2 nm, in one approach. The MR film 2 may comprise any layers and materials known in the art. In one example, the MR film 2 may comprise at least a free layer, a barrier layer, and a pinned layer. More specifically, the MR film 2 may comprise, for example, a 1 nm Ta underlayer, a 5 nm IrMn AFM layer, a 2 nm CoFeB pinned layer, a MgO tunnel insulating film, and a free layer comprising a 5 nm CoFeB/2 nm NiFe laminated film.

Then, a height mask pattern 13 is provided above the MR film 2 to establish a height from the media-facing surface in the element height direction in a range from about 50 nm to about 1000 nm, such as about 500 nm. This height mask pattern 13 is used as a mask to etch the MR film 2 using Ar ion milling, RIE, or some other suitable technique, to expose the lower magnetic shield layer 1.

Next, a refill layer 21 is deposited above the etched portions of the structure using any technique known in the art, such as a sputtering method, to a thickness in a range from about 5 nm to about 30 nm, such as about 20 nm, which may comprise any suitable material known in the art, such as $Al_2O_3$.

Figure 12B:
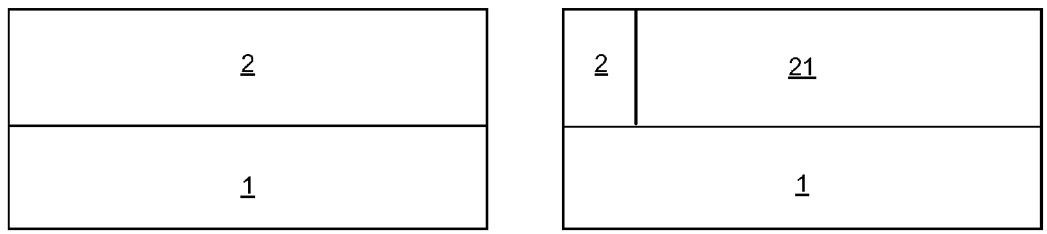

Then, as shown in FIG. 12B, the height mask pattern 13 is removed by lift-off, CMP, etc.

Figure 12C:
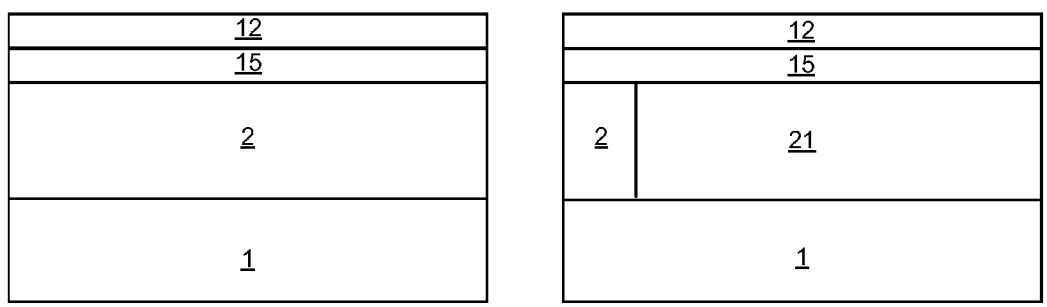

Next, as shown in FIG. 12C, an upper wiring layer 15 comprising any suitable material known in the art is deposited using any known technique, such as sputtering, in a thickness from about 1 nm to about 10 nm, such as about 5 nm. The upper wiring layer 15 may comprise Cr or the like, or NiFe, CoFe, etc. to allow the layer to also be used as a magnetic shield layer and a wiring layer. Next, an upper insulating film 12 is formed above the upper wiring layer 15 using any known formation technique, such as sputtering, to a thickness of about 1 nm to about 10 nm, such as about 2 nm. The upper insulating film 12 may comprise any suitable insulating material, such as $Al_2O_3$, MgO, etc.

Figure 12D:
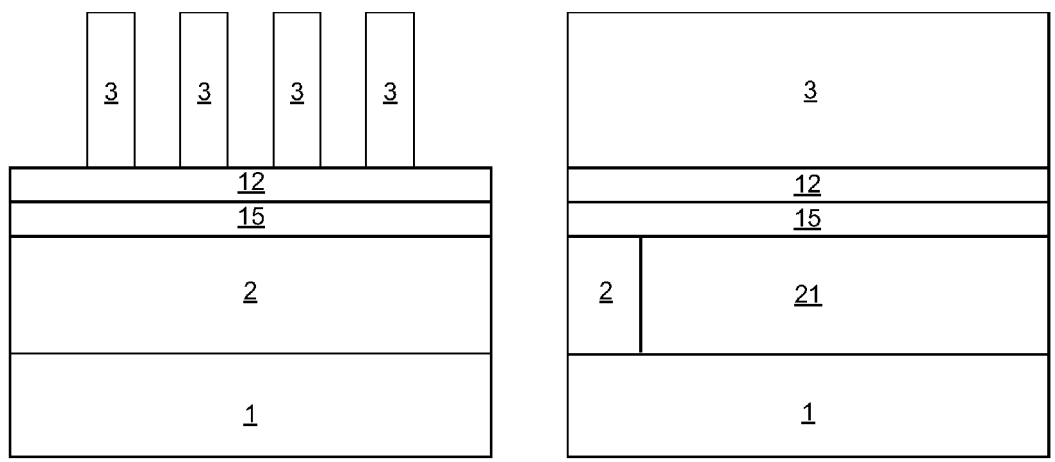

Moreover, as shown in FIG. 12D, a track pattern mask 3 is provided above the upper insulating film 12 to form a gap between later-formed elements. The track pattern mask extends full film in the element height direction. The gap may be about equal to a track width, such as from about 5 nm to about 30 nm. For example, a 20 nm track width may be fabricated in the MR film 2 by spacer-type double patterning or some other suitable method known in the art. In the spacer-type double patterning, an ArF exposure apparatus, an ArF liquid immersion exposure apparatus, or EUV may be utilized, along with a normal exposure and/or double patterning. In this approach, the track pattern mask 3 may be employed as a height direction wiring pattern. As shown, the track pattern mask 3 comprises four portions, but may include more or less based on a number of elements to be formed in the head.

Figure 12E:
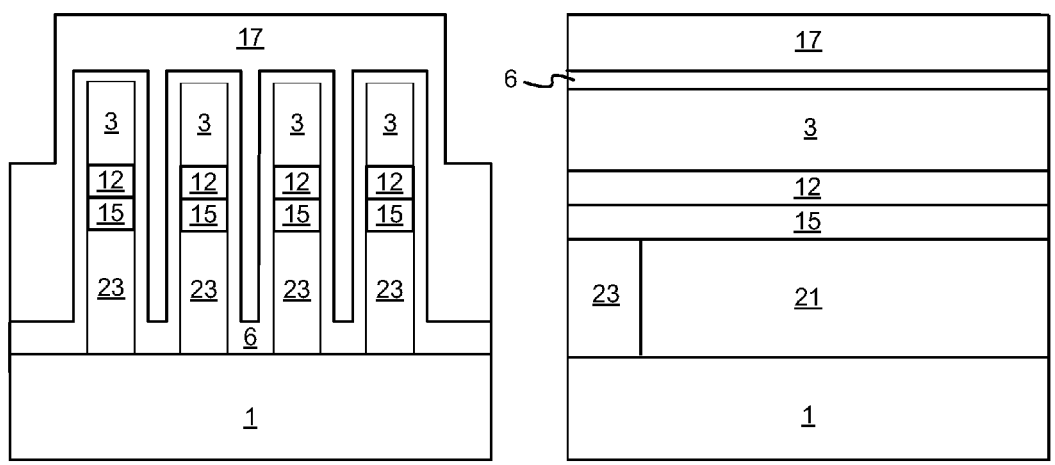

Next, as shown in FIG. 12E, using the track pattern mask 3 as a mask, the MR film 2 is etched using any suitable etching technique known in the art, such as via Ar ion milling, RIE, etc., to expose the lower magnetic shield layer 1 and fabricate a plurality of MR elements 23 which comprise portions of the MR film 2 which remains after the etching process.

Then, a refill layer 6 is formed using any suitable formation technique, such as a sputtering method. The refill layer 6 may have a thickness in a range from about 1 nm to about 30 nm, such as about 2 nm. Furthermore, the refill layer may comprise any suitable material, such as $Al_2O_3$, MgO, etc. Then, a magnetic side shield layer 17 is deposited using any suitable deposition method, such as a LTS method having excellent linearity, to a thickness in a range from about 5 nm to about 100 nm, such as about 13 nm. The magnetic side shield layer 17 may comprise any suitable material known in the art, such as NiFe among others.

Figure 12F:
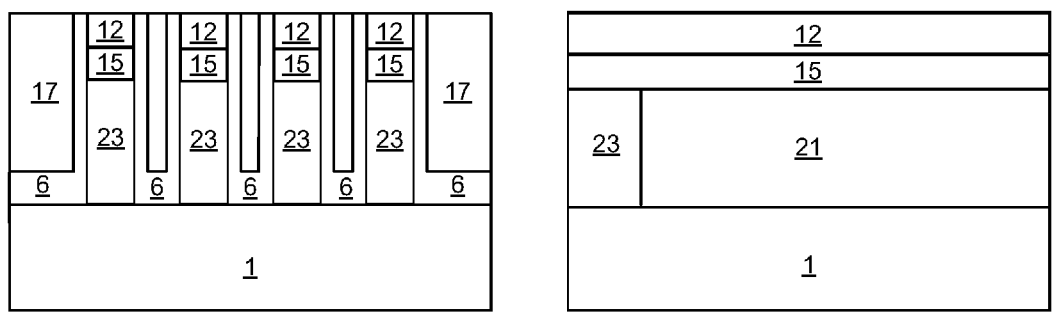
Figure 12G:
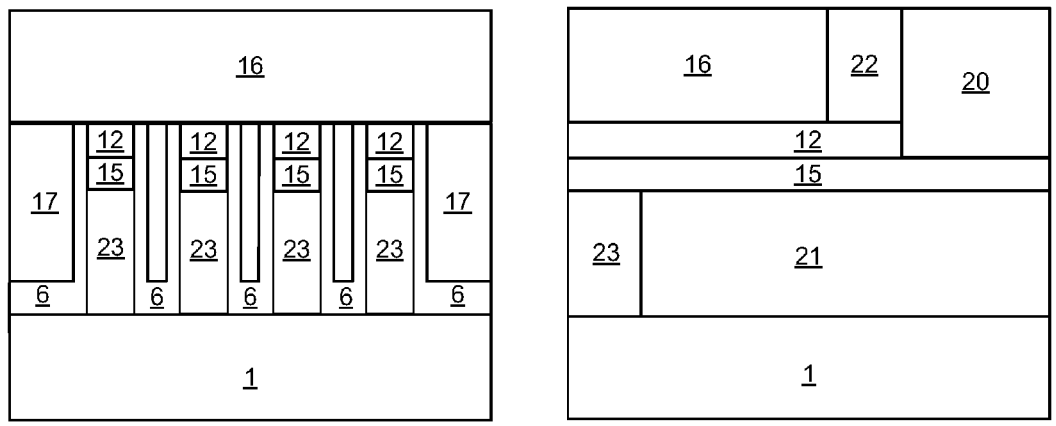

Next, as shown in FIG. 12F, the track pattern mask 3 is removed by lift-off, CMP or some other suitable technique known in the art. Then, as shown in FIG. 12G, an upper magnetic shield layer 16, a wire separation insulating layer 22, and a back wiring layer 20 are formed in sequence in the element height direction from the media-facing surface backward using any suitable method known in the art. The back wiring layer 20 comprises any suitable conductive material, such as Au, Ag, etc., and is formed to a thickness in a range between about 5 nm to about 120 nm, such as about 100 nm.

The method described in FIGS. 12A-12G is representative of the formation of one embodiment of a multi-element magnetic head. Although four MR elements 23 are shown, it is possible to form more than four elements in each read head, as would be understood by one of skill in the art, such as 8, 10, 16, 24, 32, etc.

It should be noted that methodology presented herein for at least some of the various embodiments may be implemented, in whole or in part, in computer hardware, software, by hand, using specialty equipment, etc., and combinations thereof.

The multi-element magnetic read head described herein according to various embodiments allows for signals of the included elements to be separately extracted along the element height direction, and facilitates a narrowing of the read gap width and an increase in the recording density possible for a magnetic medium used in conjunction with the multi-element magnetic read head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
    a lower shield layer positioned at a media-facing surface of the magnetic head;
    at least two magnetoresistive (MR) elements positioned above the lower shield layer, each MR element extending in an element height direction away from the media-facing surface of the magnetic head;
    back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation; and
    an upper shield layer positioned above the MR elements that is configured to electrically communicate with the MR elements.

2. The magnetic head as recited in claim 1, wherein each MR element comprises a pinned layer, a barrier layer positioned above the pinned layer, and a free layer positioned above the barrier layer.

3. The magnetic head as recited in claim 2, further comprising at least four MR elements.

4. The magnetic head as recited in claim 1, further comprising an insulating layer positioned between the lower shield layer and the MR elements, wherein the upper shield layer is configured to act as an upper electrode for the MR elements.

5. The magnetic head as recited in claim 4, further comprising a magnetic domain control layer positioned on both sides of each MR element in a cross-track direction, wherein the magnetic domain control layer is separated from each MR element by an insulating layer.

6. The magnetic head as recited in claim 4, further comprising an insulating layer positioned between the upper shield layer and the back wiring layer, wherein a portion of each MR element which extends away from the media-facing surface of the magnetic head in the element height direction is configured to act as a lower electrode for its respective MR element.

7. The magnetic head as recited in claim 4, further comprising a wiring underlayer positioned below each MR element, the wiring underlayer being configured to act as a lower electrode for its respective MR element.

8. The magnetic head as recited in claim 7, wherein the wiring underlayer comprises Cr, NiFe, and/or CoFe.

9. The magnetic head as recited in claim 1, further comprising an upper wiring layer positioned above each MR element at the media-facing surface and extending in the element height direction away from the media-facing surface, wherein the upper wiring layer is configured to electrically communicate with the back wiring layer, and wherein the lower shield layer is configured to act as a lower electrode for the MR elements.

10. The magnetic head as recited in claim 9, further comprising a magnetic domain control layer positioned on both sides of each MR element in a cross-track direction, wherein the magnetic domain control layer is separated from each MR element by an insulating layer.

11. The magnetic head as recited in claim 9, further comprising a magnetic side shield layer positioned on both sides of each MR element in a cross-track direction, wherein the magnetic side shield layer is separated from each MR element by an insulating layer.

12. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

13. A magnetic head, comprising:
a lower shield layer positioned at a media-facing surface of the magnetic head;
at least two magnetoresistive (MR) elements positioned above the lower shield layer, each MR element extending in an element height direction away from the media-facing surface of the magnetic head;
back wiring layers positioned above at least one lower layer of each of the MR elements at a position away from the media-facing surface of the magnetic head in the element height direction, wherein the back wiring layers are configured to electrically communicate with the MR elements and configured to separately extract signals from each MR element during a read operation; and
an upper wiring layer positioned above each MR element at the media-facing surface of the magnetic head and extending in the element height direction away from the media-facing surface of the magnetic head, the upper wiring layer being configured to electrically communicate with the back wiring layer,
wherein the upper wiring layer is configured to act as an upper electrode for the MR elements, and
wherein the lower shield layer is configured to act as a lower electrode for the MR elements.

14. A method for forming a magnetic head, the method comprising:
forming a lower shield layer;
forming at least two magnetoresistive (MR) elements positioned above the lower shield layer at a media-facing surface of the magnetic head, each MR element extending in an element height direction away from the media-facing surface of the magnetic head;
forming a back wiring layer positioned above the at least two MR elements at a position away from the media-facing surface of the magnetic head in the element height direction, wherein the back wiring layer is configured to electrically communicate with the at least two MR elements and configured to separately extract signals from each MR element during a read operation; and
forming an upper shield layer positioned above the at least two MR elements and configured to electrically communicate with the at least two MR elements, wherein the upper shield layer is configured to act as an upper electrode for the at least two MR elements.

15. The method as recited in claim 14, wherein forming the at least two MR elements further comprises:
forming a pinned layer;
forming a barrier layer above the pinned layer; and
forming a free layer above the barrier layer, the free layer being configured for sensing data on a magnetic medium passed across the media-facing surface of the magnetic head.

16. The method as recited in claim 14, further comprising forming an insulating layer between the lower shield layer and the at least two MR elements, wherein a portion of each MR element which extends away from the media-facing surface of the magnetic head is configured to act as a lower electrode for its respective MR element.

17. The method as recited in claim 16, further comprising forming a magnetic domain control layer on both sides of each MR element in a cross-track direction, wherein the magnetic domain control layer is separated from each MR element by an insulating layer.

18. The method as recited in claim 16, further comprising forming an insulating layer between the upper shield layer and the back wiring layer.

19. The method as recited in claim 16, further comprising forming a wiring underlayer below each MR element, the wiring underlayer being configured to act as a lower electrode for its respective MR element, wherein the wiring underlayer comprises Cr, NiFe, and/or CoFe.

20. The method as recited in claim 14, further comprising:
forming an upper wiring layer above each MR element at the media-facing surface and extending in the element height direction away from the media-facing surface, wherein the upper wiring layer is configured to electrically communicate with the back wiring layer, and
wherein the lower shield layer is configured to act as a lower electrode for the at least two MR elements; and
forming at least one of a magnetic domain control layer and a magnetic side shield layer on both sides of each MR element in a cross-track direction,
wherein the magnetic domain control layer and/or the magnetic side shield layer is separated from each MR element by an insulating layer.

* * * * *

UNITED STATES PATENT AND TRADEMARK OFFICE
CERTIFICATE OF CORRECTION

| | | |
|---|---|---|
| PATENT NO. | : 8,953,284 B1 | Page 1 of 1 |
| APPLICATION NO. | : 14/085734 | |
| DATED | : February 10, 2015 | |
| INVENTOR(S) | : Hideki Mashima et al. | |

It is certified that error appears in the above-identified patent and that said Letters Patent is hereby corrected as shown below:

In the specification:

col. 1, line 64 replace "accommodate" with --accomodate--;

col. 12, line 20 replace "layers materials" with --layers and materials--.

Signed and Sealed this
Seventh Day of July, 2015

Michelle K. Lee
*Director of the United States Patent and Trademark Office*